(12) United States Patent
Zheng et al.

(10) Patent No.: US 12,511,956 B2
(45) Date of Patent: Dec. 30, 2025

(54) VEHICLE MEASUREMENT DEVICE AND CALIBRATION METHOD

(71) Applicant: Autel Intelligent Technology Corp., Ltd., Shenzhen (CN)

(72) Inventors: Zihao Zheng, Shenzhen (CN); Biwang Lai, Shenzhen (CN); Wenhui Luo, Shenzhen (CN); Dengguo Zhang, Shenzhen (CN); Zefeng Chen, Shenzhen (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 181 days.

(21) Appl. No.: 18/575,284

(22) PCT Filed: Jul. 4, 2022

(86) PCT No.: PCT/CN2022/103705
§ 371 (c)(1),
(2) Date: Dec. 28, 2023

(87) PCT Pub. No.: WO2023/280116
PCT Pub. Date: Jan. 12, 2023

(65) Prior Publication Data
US 2024/0312264 A1    Sep. 19, 2024

(30) Foreign Application Priority Data

Jul. 7, 2021   (CN) .......................... 202110768993.7
Aug. 25, 2021  (CN) .......................... 202110982408.3

(51) Int. Cl.
*G01S 7/40*    (2006.01)
*G01B 11/275*  (2006.01)
(Continued)

(52) U.S. Cl.
CPC ........ *G07C 5/0808* (2013.01); *G01B 11/2755* (2013.01); *G06T 7/70* (2017.01);
(Continued)

(58) Field of Classification Search
CPC ................... G07C 5/0808; G06T 7/70; G06T 2207/30252; G01B 11/2755; G01B 2210/14; G01S 7/40
(Continued)

(56) References Cited

U.S. PATENT DOCUMENTS 10,634,488 B2 *   4/2020   Stieff ................... G01S 7/4972

FOREIGN PATENT DOCUMENTS

CN      201634378 U    11/2010
CN      105241674 A    1/2016
(Continued)

OTHER PUBLICATIONS

The extended European search report of EP patent application No. 22836867.6 issued on Oct. 17, 2024.
(Continued)

*Primary Examiner* — Tiffany P Young
(74) *Attorney, Agent, or Firm* — Andrew C. Cheng

(57) ABSTRACT

A vehicle measurement device includes a base module, a column module, a cross beam module, and a camera assembly. The column module includes a fixed column, a movable column assembly, and a drive assembly. The fixed column is connected to the base module. The movable column assembly is mounted on the fixed column. The movable column assembly is connected to the drive assembly. The drive assembly is used for driving the movable column assembly to lift or lower relative to the fixed column. The cross beam module is supported by the movable column assembly. The cross beam module is used for supporting a calibration element. The camera assembly is mounted on the cross beam
(Continued)

module. The camera assembly is used for capturing wheel information of a vehicle. By means of the structure, the vehicle measurement device can not only calibrate an ADAS, but also perform four-wheel positioning.

19 Claims, 26 Drawing Sheets

(51) Int. Cl.
  *G06T 7/70* (2017.01)
  *G07C 5/08* (2006.01)
(52) U.S. Cl.
  CPC ............ *G01B 2210/14* (2013.01); *G01S 7/40* (2013.01); *G06T 2207/30252* (2013.01)
(58) Field of Classification Search
  USPC ........................................................ 701/33.1
  See application file for complete search history.

(56) References Cited

FOREIGN PATENT DOCUMENTS

| CN | 206132404 U | 4/2017 |
|----|---|---|
| CN | 110207650 A | 9/2019 |
| CN | 111336364 A | 6/2020 |
| CN | 111457226 A | 7/2020 |
| CN | 111520594 A | 8/2020 |
| CN | 111521209 A | 8/2020 |
| CN | 111521211 A | 8/2020 |
| CN | 111537015 A | 8/2020 |
| CN | 111599036 A | 8/2020 |
| CN | 111879262 A | 11/2020 |
| CN | 112066915 A | 12/2020 |
| CN | 112567204 A | 3/2021 |
| CN | 212691245 U | 3/2021 |
| CN | 213274144 U | 5/2021 |
| CN | 112945178 A | 6/2021 |
| CN | 113720616 A | 11/2021 |
| WO | 2018/067354 A1 | 4/2018 |
| WO | 2019/201341 A1 | 10/2019 |

OTHER PUBLICATIONS

The first office action with translation of CN patent application No. 202110982408.3 issued on Nov. 30, 2023.
International search report of PCT patent application No. PCT/CN2022/103705 issued on Sep. 21, 2022.
The first office action of CN application No. 202110982408.3 issued on Nov. 30, 2023.
The search report of CN application No. 202110982408.3 issued on Nov. 30, 2023.

* cited by examiner

VEHICLE MEASUREMENT DEVICE AND CALIBRATION METHOD

CROSS-REFERENCE TO RELATED APPLICATIONS

The present application is the National Stage application for PCT Patent Application No. PCT/CN2022/103705 filed on Jul. 4, 2022, which claims priority to application Ser. No. 20/211,0768993.7, entitled "VEHICLE MEASUREMENT DEVICE AND CALIBRATION METHOD", filed on Jul. 7, 2021, by China Patent Office, and application Ser. No. 20/211,0982408.3, entitled "VEHICLE MEASUREMENT DEVICE AND CALIBRATION METHOD", filed on Aug. 25, 2021, by China Patent Office, which is incorporated herein by reference in its entirety.

TECHNICAL FIELD

Embodiments of the present invention relate to the field of vehicle calibration and, more particularly, to a vehicle measurement device and calibration method.

BACKGROUND OF THE INVENTION

As an indispensable vehicle in people's daily life, the automobile has been used in many fields, and there are increasing requirements for its safety performance. In general, after a period of use, the vehicle will need to be sent to a maintenance shop for maintenance, such as: wheels are calibrated by four-wheel positioning; or ADAS is calibrated to ensure that sensors such as cameras or radars inside the vehicle accurately acquire road condition information.

At present, the Advanced Driver Assistant Systems (ADAS) vehicle measurement devices and the four-wheel positioning devices on the market exist independently, which can only achieve a single function. When ADAS calibration and four-wheel positioning are needed, it is necessary to purchase two kinds of devices at the same time, and move the vehicle to two work stations for maintenance respectively, which not only increases the cost, but also has low maintenance efficiency, and the two kinds of devices will take up more space and are inconvenient to use.

SUMMARY OF THE INVENTION

In order to solve the above technical problem, embodiments of the present invention provide a vehicle measurement device and a calibration method.

The embodiments of the present invention solve the technical problem thereof by using the following technical solutions:

a vehicle measurement device includes:
a base module;
a column module including a fixed column, a movable column assembly, and a drive assembly, wherein the fixed column is connected to the base module, the movable column assembly is mounted to the fixed column, the movable column assembly is connected to the drive assembly, and the drive assembly is used for driving the movable column assembly to lift or lower relative to the fixed column;
a cross-beam module supported by the movable column assembly and used for supporting a calibration element; and
a camera assembly mounted to the cross-beam module and used for capturing wheel information of a vehicle.

Alternatively, the drive assembly includes a pusher including a push rod and a body, wherein the push rod is movably mounted inside the body, and an end of the push rod away from the body is connected to the movable column assembly;
when the push rod gradually extends out of the body, the push rod will gradually push the movable column assembly to extend out of the fixed column, and when the push rod is retracted back into the body, the push rod will bring the movable column assembly to retract into the fixed column.

Alternatively, the drive assembly further includes a drive motor and a conversion box, wherein an output shaft of the drive motor is connected to the conversion box, the body is connected to the conversion box, and the conversion box is connected to the fixed column;
when the output shaft of the drive motor is rotated, the conversion box will drive the push rod to push the movable column assembly to extend out of or retract into the fixed column.

Alternatively, the bottom of the fixed column is provided with a fixed support, and the drive assembly further includes a hinged plate mounted to an end of the conversion box facing the fixed support, and the fixed support is hinged with the hinged plate.

Alternatively, the top of the fixed column is provided with a limit seat provided with a through opening, and an end of the push rod away from the body passes through the through opening and is connected to the movable column assembly.

Alternatively, a lateral end of the limit seat is movably mounted with a roller that extends partially beyond an edge of the limit seat and abuts against the movable column assembly.

Alternatively, the fixed column is provided with a receiving cavity, the movable column assembly is received in the receiving cavity, and the movable column assembly is movable to extend or retract the receiving cavity.

Alternatively, the fixed column is provided with a sliding assembly, the movable column assembly is connected to the sliding assembly used for directionally lifting and lowering the movable column assembly under the action of the drive assembly.

Alternatively, the sliding assembly includes a guide rail mounted to an inner wall of the fixed column and arranged in an axial direction of the fixed column, and a sliding block fitted with the guide rail, and the sliding block is connected to the movable column assembly.

Alternatively, the movable column assembly includes a column, a traction member, and a lifting plate, wherein the traction member is mounted to the column, one end of the traction member is connected to the fixed column, the other end of the traction member is connected to the lifting plate connected to the cross-beam module;
when the drive assembly drives the movable column assembly to lift or lower relative to the fixed column, the lift plate will move the cross-beam module relative to the column.

Alternatively, the traction member includes a chain, the rotating element includes a sprocket, and the chain and the sprocket are intermeshed.

Alternatively, the movable column assembly further includes a rotating member mounted to the column, the other end of the traction member is disposed about the rotating member and connected to the lifting plate.

Alternatively, the column includes a top plate at an end of the column away from the fixed column, and the rotating member is rotatably mounted to the support base.

Alternatively, the column is provided with a guide structure by means of which the lifting plate is directionally moved in the axial direction of the column.

Alternatively, the movable column assembly further includes a connecting support mounted to the column and distributed in an axial direction of the column and away from the fixed column, and the connecting support is used for connecting with the drive assembly.

Alternatively, the movable column assembly further includes a resistance reducing member mounted to the column and abuts against an inner wall of the fixed column.

Alternatively, the movable column further includes a guide link mounted to the column and connected to the fixed column, and the guide link is used for moving the column in the axial direction of the fixed column.

Alternatively, a side end of the column is provided with a relief groove, the relief groove and the lifting plate are respectively located at two opposite side ends of the column, the column is movably received in the fixed column, and the relief groove is used for relieving the drive assembly.

Alternatively, the vehicle measurement device further includes a control system mounted to the fixed column for controlling the drive assembly to drive the movable column assembly to lift or lower relative to the fixed column.

Alternatively, the vehicle measurement device further includes a display assembly connected to the fixed column for displaying wheel information captured by the camera assembly.

Alternatively, the display assembly includes a display screen and a fixed bracket, the fixed bracket is mounted to the fixed column, and the display screen is mounted to the fixed bracket.

Alternatively, the display assembly further includes a folding bracket including a first fixing piece, a second fixing piece, a first support arm and a second support ann, the first fixing piece is fixedly connected to the display screen, one end of the first support arm is hinged to the first fixing piece, the other end of the first support arm is hinged to one end of the second support arm, the other end of the second support arm is connected to the second fixing piece, and the second fixing piece is connected to the fixed bracket.

Alternatively, the vehicle measurement device further includes a support mounted to the fixed column for supporting a diagnostic instrument.

Alternatively, the vehicle measurement device further includes a handle mounted to a side end of the fixed column.

Alternatively, the cross-beam module includes a cross beam including a left cross beam portion, a right cross beam portion, and a connecting portion, the connecting portion is supported by the movable column assembly, one end of the connecting portion is pivotably connected to the left cross beam portion, and the other end of the connecting portion is pivotably connected to the right cross beam portion.

Alternatively, the cross-beam module further includes a hinge assembly including a first fixed seat, a second fixed seat and a pivot shaft, wherein the first fixed seat is hinged to the second fixed seat via the pivot shaft, the first fixed seat and the second fixed seat both are mounted to the cross beam, and the hinge assembly is used for hinging the left cross beam portion with the connecting portion and the right cross beam portion with the connecting portion.

Alternatively, the cross-beam module further includes a locking assembly mounted to the hinge assembly for locking the first fixed seat with the second fixed seat to place the cross beam in an unfolded state.

Alternatively, the hinge assemblies and the locking assemblies are in two sets, one set of the hinge assemblies and one set of the locking assemblies are mounted where the left cross beam portion is connected to the connecting portion, and the other set of the hinge assemblies and the other set of the locking assemblies are mounted where the right cross beam portion is connected to the connecting portion.

Alternatively, the locking assembly includes a first fixed block mounted to the first fixed seat, a second fixed block mounted to the second fixed seat, a rotating rod having one end rotatably mounted to the second fixed block and the other end mounted to a clamping member, and the clamping member, wherein the first fixed block is provided with a slot opening, and when the rotating rod is rotated to be embedded into the slot opening, the clamping member abuts against the first fixed block to lock the first fixed seat and the second fixed seat.

Alternatively, the first fixed block is provided with a protruding portion and the second fixed block is provided with a recessed portion, the protruding portion is adapted to the recessed portion, and the protruding portion is embedded in the recessed portion when the cross beam is in the unfolded state.

Alternatively, the cross-beam module further includes a detection sensor mounted to the connecting portion for detecting whether the left cross beam portion and the right cross beam portion are folded with the connecting portion.

Alternatively, the cross-beam module further includes a buffer mounted to the cross beam for slowing a rotational speed of the left and right cross beam portions relative to the connecting portion.

Alternatively, the cross-beam module further includes a hanging mechanism mounted to the cross beam for mounting a calibration element.

Alternatively, the hanging mechanism includes a main sliding plate assembly including a main sliding plate and at least two rolling members, the connecting portion is provided with a first sliding groove, one end of the at least two rolling members is respectively mounted to the main sliding plate, the other end of the at least two rolling members is respectively mounted to the first sliding groove, and the main sliding plate slides in the first sliding groove via the rolling members.

Alternatively, the main sliding plate assembly further includes a screw and a stopper, wherein the main sliding plate is provided with a threaded hole, the screw is screwed to the threaded hole, and the screw is connected to the stopper;

when the screw is screwed in a first direction, the stopper gradually moves toward a groove wall of the first sliding groove and abuts, so that the main sliding plate is in a locked state; when the screw member is screwed in a second direction, the stopper gradually moves away from the groove wall of the first slide groove so that the main sliding plate is in an unlocked state, at which time the main sliding plate can slide along the first slide groove.

Alternatively, the hanging mechanism further includes two secondary sliding plate assemblies slidably mounted at either end of the cross beam and a suspension rod assembly mounted to the cross beam, and the two secondary sliding plate assemblies cooperate with the suspension rod assembly to support the calibration element.

Alternatively, the secondary sliding plate assembly includes a secondary sliding plate and at least two pulley rods, the left cross beam portion and the right cross beam portion are both provided with a second sliding groove, one end of the at least two pulley rods is respectively detachably mounted to the secondary sliding plate, the other end of the at least two pulley rods is respectively mounted to the second sliding groove, and the secondary sliding plate slides in the second sliding groove via the pulley rods.

Alternatively, the secondary sliding plate assembly includes a pointer member mounted to the secondary sliding plate, the cross beam is provided with a track bar, and the pointer member is used for indicating a scale position of the secondary sliding plate on the cross beam.

Alternatively, the secondary sliding plate assembly includes a mounting seat, a support shaft, a torsion spring, a wrench and a brake, the mounting seat is mounted to the secondary sliding plate, the support shaft is mounted to the mounting seat, the torsion spring and the wrench are both sleeved on the support shaft, and one end of the torsion spring abuts against the secondary sliding plate, the other end of the torsion spring abuts against the wrench, one end of the brake is connected to the wrench, and the other end of the brake abuts against the cross beam;

when the wrench is unplugged, the wrench drives the brake to move in a direction away from the cross beam, so that the secondary sliding plate can slide in the second sliding groove via the pulley rod, the wrench is released, and under the action of the torsion spring, the wrench will push the brake to move in a direction close to the cross beam and abut, so that the secondary sliding plate is placed in a locked state.

Alternatively, the secondary sliding plate is provided with embedding openings in which magnetic members are embedded.

Alternatively, side ends of the secondary sliding plates are provided with slot openings, and the slot openings of the secondary sliding plates at the opposite ends of the cross beam are arranged opposite to each other, so that the two slot openings can hold the calibration element together.

Alternatively, the suspension rod assembly includes a connecting block, a receiving rod and a support rod, the connecting block is mounted to the cross beam, the receiving rod is connected to the connecting block, the receiving rod is received in the receiving space, the support rod can be extendable or retractable with respect to the receiving rod, and the support rod is used for supporting the calibration element.

Alternatively, the receiving rod is provided with a positioning hole, and the support rod is provided with a spring bead which can cooperate with the positioning hole when the support rod is withdrawn relative to the receiving rod.

Alternatively, the cross-beam module further includes an adjustment mechanism connected to the movable column assembly, wherein the cross beam is mounted to the adjustment mechanism, and the adjustment mechanism is used for adjusting a position of the cross beam relative to the fixed column.

Alternatively, the adjustment mechanism includes a first connecting plate, a second connecting plate, a support plate and an adjustment assembly, the first connecting plate is connected to the cross beam, the second connecting plate is connected to the movable column assembly, the support plate is connected to the second connecting plate and is located between the first connecting plate and the second connecting plate, and the adjustment assembly is mounted to the first connecting plate, the second connecting plate and the support plate for adjusting the relative position between the cross beam and the fixed column.

Alternatively, the adjustment assembly includes a pivot shaft a first driving rod, an resilient member and a mounting rod, the pivot shaft is rotatably mounted to the support plate, the first connecting plate is connected to the pivot shaft, the first driving rod is connected to one end of the first connecting plate, the first driving rod is threadedly connected to the support plate, the mounting rod is mounted to the other end of the first connecting plate, the mounting rod faces the support plate, and the resilient member is sleeved on the mounting rod;

when the first driving rod is screwed, one end of the first connecting plate moves in a direction away from the support plate, and under the action of the pivot shaft, the other end of the first connecting plate moves in a direction close to the support plate and presses the resilient member, so that the first connecting plate drives the cross beam to rotate around the fixed column.

Alternatively, the adjustment assembly further includes a receiving member having one end provided with an opening, the support plate is provided with a communication hole, the receiving member is mounted to the support plate, the opening communicates with the communication hole, the resilient member is partially received in the receiving member, one end of the resilient member abuts a bottom of the receiving member and the other end of the resilient member abuts against the first connecting plate, and an aperture of the communication hole is larger than an axial diameter of the mounting rod.

Alternatively, the adjustment assembly further includes a second screw, a rack, a gear and a sliding bar, the sliding bar is mounted to the support plate and can slide along a pre-set direction with respect to the support plate, the second connecting plate is connected to the sliding bar, the rack is mounted to the support plate, the support plate is provided with a relief hole, one end of the second screw is mounted with the gear, the other end of the second screw passes through the relief hole, and the gear meshes with the rack;

when the second screw is screwed, the gear drives the rack to move the support plate in the preset direction.

Alternatively, the adjustment assembly further includes a guide sliding block mounted to the support plate, and the guide sliding block is in cooperation with the sliding bar.

Alternatively, the adjustment assembly further includes a clip member and a locking member, the clip member has an annular hole and is sleeved on the second screw through the annular hole, the clip member is fixedly mounted to the second connecting plate, the locking member is hinged with the clip member, and a caliber of the annular hole is greater than a shaft diameter of the second screw;

when the locking member is in a first position, the second screw is screwed, the support plate is movable relative to the second connecting plate, and the locking member is rotated to a second position so that a hole wall of the annular hole closely abuts against the second screw, and the second screw is in a locked state.

Alternatively, the adjustment mechanism further includes a horizontal bead mounted to the support plate for detecting whether the cross beam is in a horizontal state.

Alternatively, the support plate is provided with a receiving cavity, and the cross-beam module further includes a laser received in the receiving cavity and fixedly connected to the support plate, and the laser is used for measuring the height of the cross beam from the ground.

Alternatively, the camera assembly includes a first camera mounted to the left cross beam and a second camera mounted to the right cross beam, wherein the first camera and the second camera are used for capturing wheel information on two sides of a vehicle, respectively.

Alternatively, the camera assembly further includes a third camera mounted to the connecting portion for capturing head information of the vehicle.

Alternatively, the vehicle measurement device further includes a main controller for processing the wheel information of the vehicle.

The embodiments of the present invention solve the technical problem thereof by using the following technical solutions;

a vehicle calibration method applied to the vehicle measurement device described above, wherein the vehicle measurement device further includes a processor, the cross-beam module includes a cross beam, the camera assembly is mounted to the cross beam, and a calibration device is mounted to wheels of the vehicle, the method including;

acquiring a first calibration image of the calibration device on one side of the vehicle acquired by the camera assembly;

determining, according to the first calibration image, a first position of the wheels on one side of the vehicle relative to the camera assembly;

acquiring a second calibration image of a calibration device on the other side of the vehicle acquired by the camera assembly;

determining, according to the second calibration image, a second position of the wheels on the other side of the vehicle relative to the camera assembly; and determining a position of the wheels of the vehicle according to the first position and the second position.

Advantageous effects of embodiments of the present invention are: a vehicle measurement device provided by an embodiment of the present invention includes a base module, a column module including a fixed column, a movable column assembly, and a drive assembly, wherein the fixed column is connected to the base module, the movable column assembly is mounted to the fixed column, the movable column assembly is connected to the drive assembly, and the drive assembly is used for driving the movable column assembly to lift or lower relative to the fixed column; a cross-beam module supported by the movable column assembly and used for supporting a calibration element; and a camera assembly mounted to the cross-beam module and used for capturing wheel information of a vehicle. By means of the structure, the vehicle measurement device can not only calibrate an ADAS, but also perform four-wheel positioning, so that it is unnecessary to purchase two devices, and the cost is reduced. At the same time, the vehicle does not need to be moved to two stations for maintenance, so that the maintenance efficiency is improved, and the device is more convenient to use.

BRIEF DESCRIPTION OF DRAWINGS

One or more embodiments are illustrated by way of example and not by way of limitation in the figures of the accompanying drawings, in which elements having the same reference numeral designations represent similar elements, and in which the figures are not to scale unless otherwise specified.

DETAILED DESCRIPTION OF THE INVENTION

Figure 1:
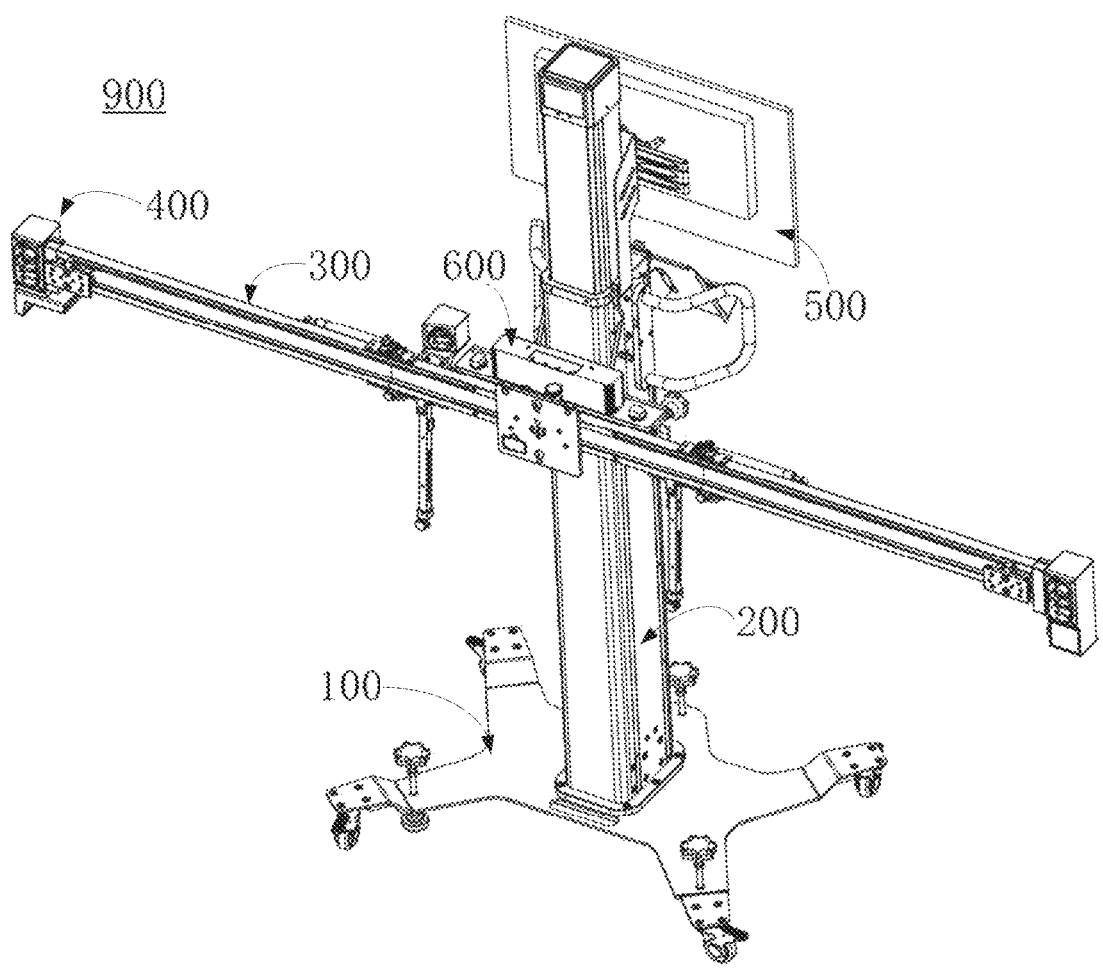
FIG. 1 is a structural schematic diagram of a vehicle measurement device according to an embodiment of the present invention.

In order that the present invention may be readily understood, a more particular description of the present invention will be rendered by reference to the appended drawings and detailed description. It will be understood that when an element is referred to as being "secured" to another element, it can be directly on another element or there may be one or more intervening elements in between. When an element is referred to as being "coupled" to another element, it can be directly connected to another element or there may be one or more intervening elements in between. As used in the description, the terms "upper", "lower", "inner", "outer", "vertical", "horizontal" and the like indicate orientations or positional relationships based on the orientation or positional relationships shown in the drawings, are merely for convenience in describing and simplifying the present invention, and do not indicate or imply that the referenced apparatuses or elements must have a particular orientation, be constructed and operated in a particular orientation, and thus are not to be construed as limiting the present invention. Further, the terms "first" and "second", etc. are used for descriptive purposes only and are not to be construed as indicating or implying relative importance.

Unless defined otherwise, all technical and scientific terms used in the description have the same meaning as commonly understood by a person skilled in the art to which the present invention belongs. The terminology used herein in the description of the present invention herein is for the purpose of describing particular embodiments only and is not intended to be limiting of the present invention. As used herein, the term "and/or" includes any and all combinations of one or more of the associated listed items.

Furthermore, the technical features involved in the different an embodiment of the present invention described below can be combined with each other if they do not conflict with each other.

Figure 2:
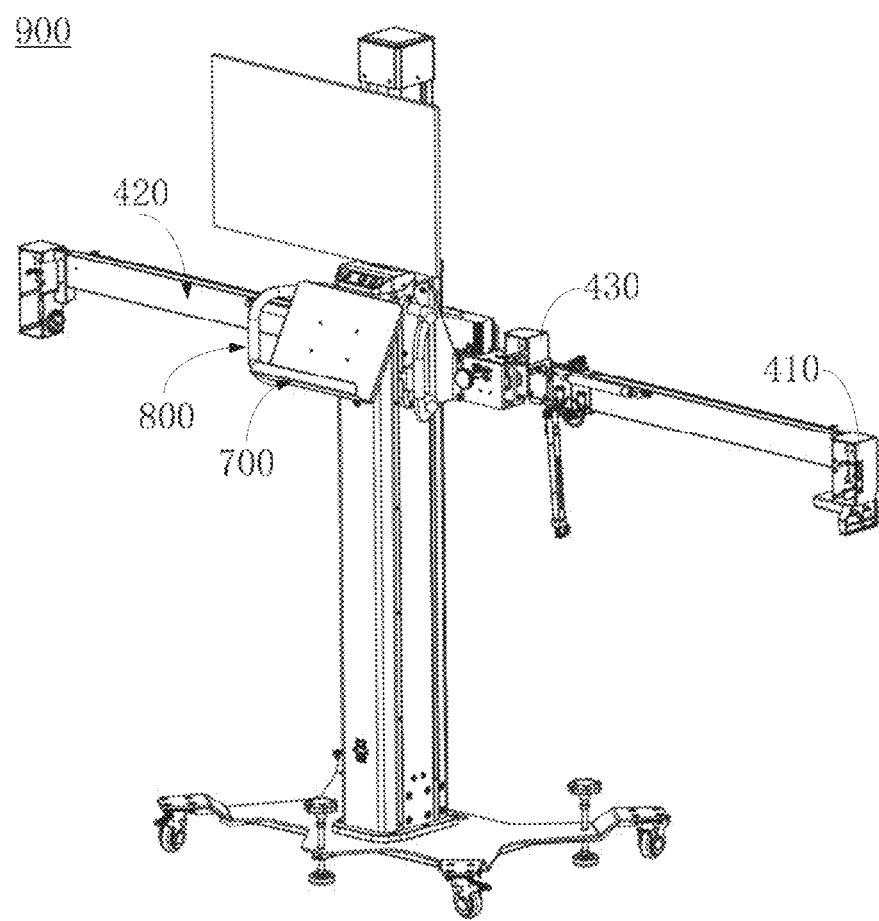
FIG. 2 is a schematic diagram from another perspective of FIG. 1.
Figure 3:
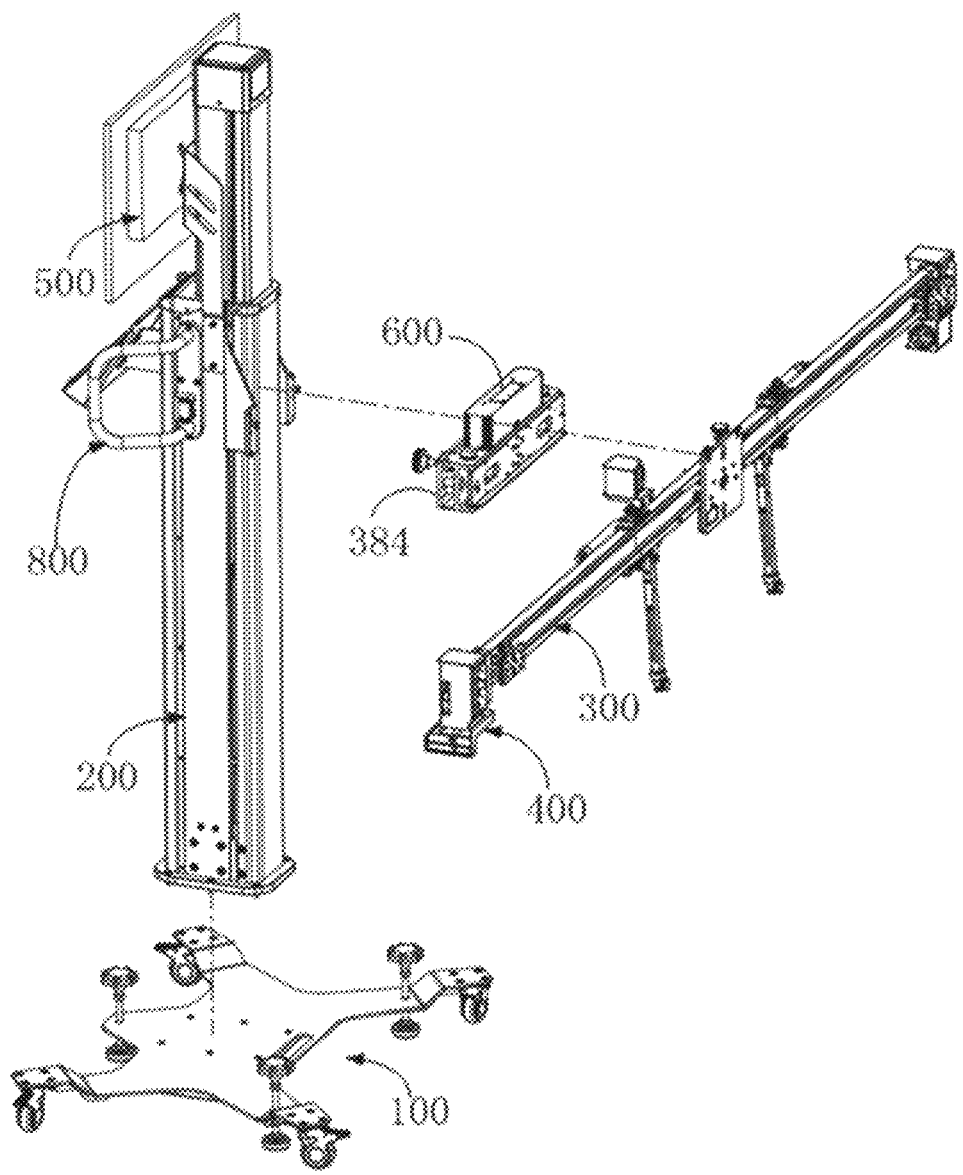
FIG. 3 is an exploded view of the structure of FIG. 1.

As shown in FIGS. 1-3, one embodiment of the present invention provides a vehicle measurement device 900 including a base module 100, a column module 200 mounted to the base module 100, a cross-beam module 300 mounted to the column module 200, and a camera assembly 400 mounted to the cross-beam module 300. The column module 200 is used for supporting the cross-beam module 300 and can be used for adjusting the height of the cross-beam module 300 from the ground. The cross-beam module 300 may be used for supporting calibration elements. The camera assembly 400 is used for capturing wheel information of a vehicle. As such, a user can capture wheel information of the vehicle through the camera assembly 400 to calibrate the wheels of the vehicle for four-wheel positioning, while also supporting calibration elements through the cross-beam module 300 to calibrate sensors on the vehicle.

Figure 4:
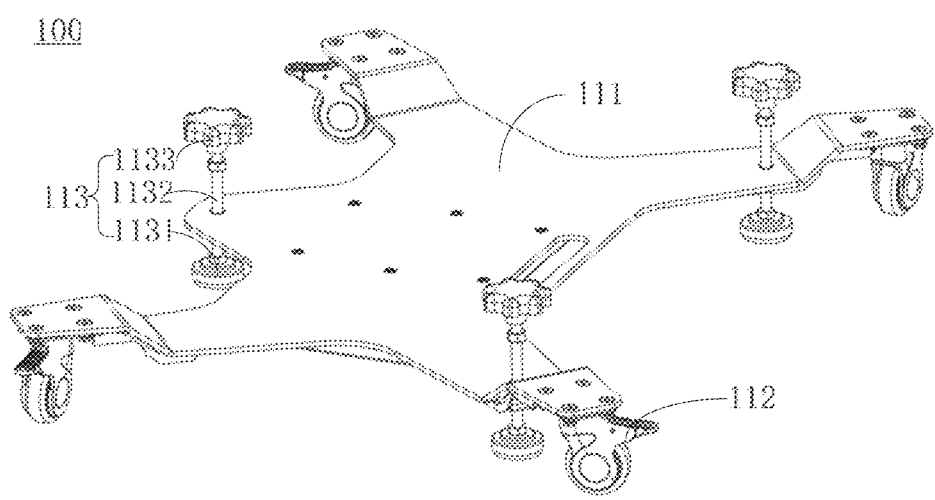
FIG. 4 is a structural schematic diagram of the base module of FIG. 3.

Referring to FIG. 4, in some embodiments, the base module 100 includes a base 111, a plurality of caster wheels 112, and a plurality of foot cups 113, each mounted to the base 111. The caster wheels 112 may facilitate movement of the vehicle measurement device 900, the foot cups 113 may be used for stabilizing the base module 100 at a particular location, and the foot cups 113 may also be used for adjusting the height of the base module 100. The base 111 is used for mounting the column module 200. In this embodiment, the base 111 has four outwardly extending mounting portions (not shown), and the number of the caster wheels 112 is four, one for each mounting portion. The number of the foot cups 113 is three, three of the foot cups are triangularly distributed at three positions of the base 111, and by adjusting the foot cups, an angle of the column module with respect to the ground can be adjusted, and then a pitch angle of the measurement module can be adjusted. The foot cup 113 includes a support block 1131, a connecting rod 1132 and a cap 1133, the outer surface of the connecting rod 1132 has threads, one end of the connecting rod 1132 is threadedly connected to the cap 1133, the other end of the connecting rod is threadedly connected to the support block 1131, and the support block 1131 is used for abuts against the ground. As such, the distance between the base 11I and the ground can be adjusted by screwing the nut portion 1133 to adjust the overall position and the overall posture of the vehicle measurement device 900.

Figure 5:
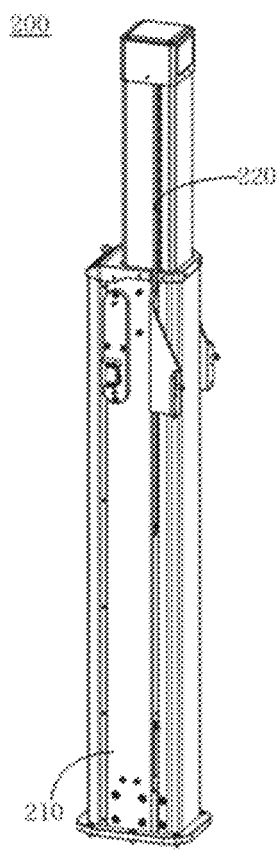
FIG. 5 is a schematic diagram of the column module of FIG. 1.
Figure 6:
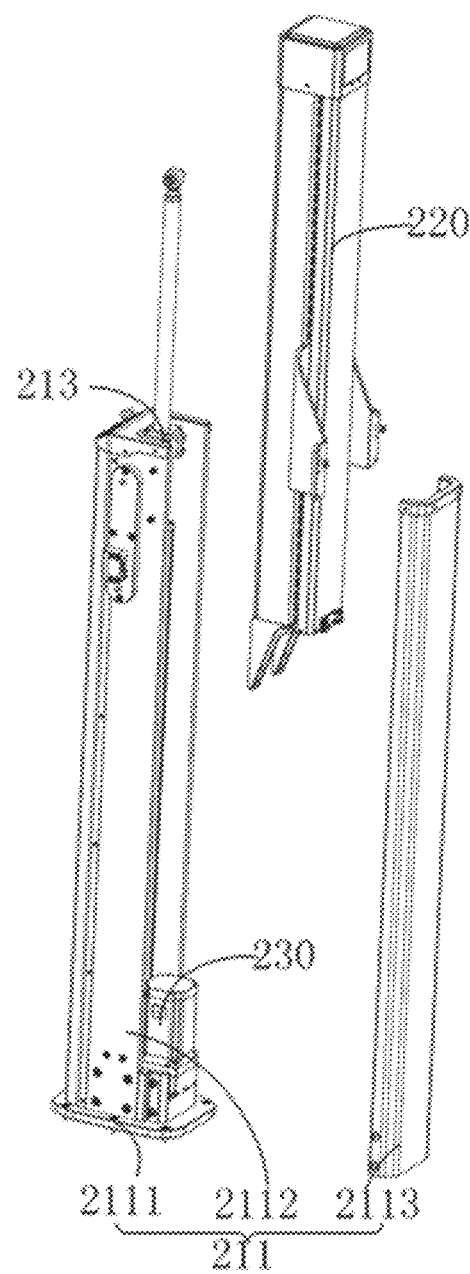
FIG. 6 is an exploded view of the structure of FIG. 5.
Figure 7:
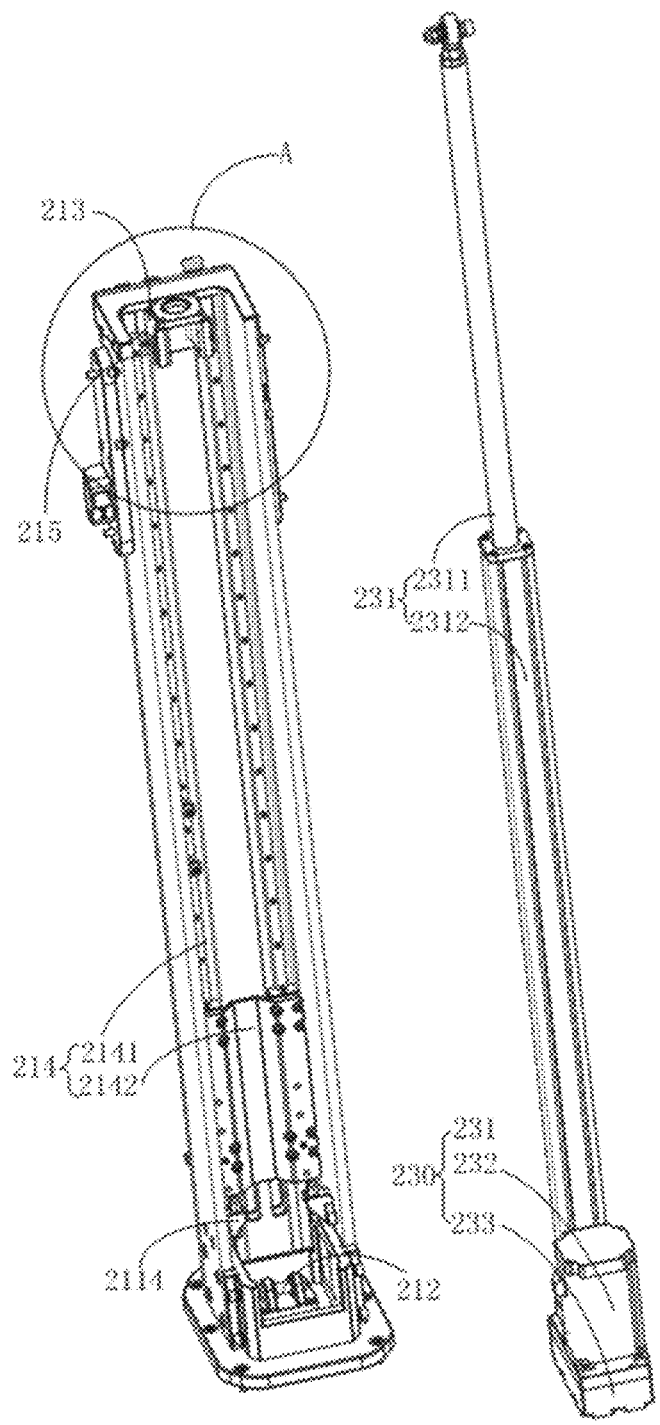
FIG. 7 is an exploded view of a portion of the structure of FIG. 6.

As shown in FIGS. 5-7, in some embodiments, the column module 200 includes a fixed column 210, a mobile column assembly 220, and a drive assembly 230, wherein the fixed column 210 is connected to the base 111, the mobile column assembly 220 is movably mounted to the fixed column 210 and connected to the drive assembly 230, and the drive assembly 230 can be provided within the fixed column. In some implementations, the drive assembly 230 is used for driving only the movable column assembly 220 up or down relative to the fixed column 210, and the cross-beam module 300 up or down simultaneously with the movable column 220. As such, the cross-beam module 300 may be controlled to be raised or lowered by the drive assembly 230 so that the cross-beam module 300 will be adjustable to different ground heights so that the vehicle measurement device 900 may be adapted to more scenarios, for example, vehicles of different vehicle models may be calibrated using the same vehicle measurement device 900. In the present application, "up" or "down" refers to vertical movement relative to a reference that is substantially the same as the length of the column module, e.g., vertical movement of the movable column assembly 220 relative to the fixed column 210, vertical movement of the cross-beam module 300 relative to the movable column assembly 220, etc. In other implementations, while the drive assembly is used for driving the movable column assembly 220 up or down relative to the fixed column 210, the drive assembly 230 is also used for driving the cross-beam module 300 up or down relative to the movable column assembly 220. That is, the movable column assemblies 220 are not synchronized with the movement of the cross-beam modules 300. The movable column assembly 220 and the cross-beam module 300 may move in the same direction or in opposite directions, the moving speed of the movable column assembly 220 and the moving speed of the cross-beam module 300 may be the same or different, the drive mechanism in the drive assembly for driving the movable column assembly 220 relative to the fixed mast 210 may be associated with the drive mechanism for driving the cross-beam module 300 relative to the movable column assembly 220, or the two drive mechanisms may be independent of each other. The present application mainly introduces some implementations in which the drive assembly drives the movable column assembly 210 in the same direction as the movement of the cross-beam module 300, and the moving speed of the cross-beam module 300 is faster than that of the movable column assembly 210, and other drive methods for the drive assembly shall also be included in the scope of the present application. By allowing the movable column assembly 220 to move relative to the fixed column 210 and the cross-beam module 300 to move relative to the movable column assembly 210, the volume of the column module can be reduced while ensuring the range of motion of the cross-beam module and extending the range of use, which can meet the requirements of both the measurement of wheel positioning functions at different heights and the calibration of auxiliary systems at different heights.

With reference to FIGS. 5 and 6, the fixed column 210 includes a column housing 211, a fixed support 212, a limit seat 213 and a sliding assembly 214, wherein the fixed support 212, the limit seat 213 and the sliding assembly 214 are all mounted in the column housing 211, and the fixed support 212 and the limit seat 213 are respectively located at two ends of the column housing 211, the fixed support 212 is used for connecting with the drive assembly 230, the limit seat 213 is used for limiting the movable column assembly 220, and the sliding assembly 214 is used for connecting with the movable column assembly 220.

The column housing 211 includes a base 2111, a first column housing 2112, and a second column housing 2113. The base 2111 is used for fixedly mounting to a base 111 in a base module 100, the fixing support 212 is provided on the base 2111, the first column housing 2112 is mounted to the base 2111 and forms a receiving cavity (not shown), and the second column housing 2113 is detachably connected to the first column housing 2112 to enclose the receiving cavity. When the second column housing 2113 is mounted to the base 2111, a gap exists between the second column housing 2113 and the first column housing 2111; specifically, each of the first column housing 2111 and the second column housing 2113 includes a main plate and two side plates, and the two side plates are arranged on two sides of the main plate and are arranged opposite to each other, so that the cross section of the first column housing 2111 and the second column housing 2113 is generally concave, and the main plate of the first column housing 2111 and the second column housing 2113 are opposite to each other; the side plates of the first column housing 2111 and the second column housing 2113 located on the same side are not connected and coupled, but have a gap, likewise, a gap also exists between the side plates of the first column housing 2111 and the side plates of the second column housing 2113 on the other side, and the gaps between the side plates on two sides are in a substantially vertical direction, which is the same as the movement direction of the cross-beam module 300. Through the gap formed by the first column housing 2112 and the second column housing 2113, it is possible to achieve free sliding of the cross-beam module on the fixed column, i.e. to ensure that the lifting plate for mounting the cross-beam module described below can move relative to the fixed column. The fixed support 212 is detachably mounted to the base 2111 and received in the receiving cavity, the limit seat 213 is mounted to an end of the first column housing 2112 away from the base 2111, and the sliding assembly 214 is slidably mounted to the first column housing 2112. In this embodiment, the first column housing 2112 is provided with two symmetrically disposed fixing members 2114 adjacent to the base 2111.

The sliding assembly 214 includes a guide rail 2141 mounted to an inner wall of the first column housing 2112 and arranged along an axial direction (length direction) of the first column housing 2112, a sliding block 2142 is fitted with the guide rail 2141, and the sliding block 2142 is connected to the movable column assembly 220.

Figure 8:
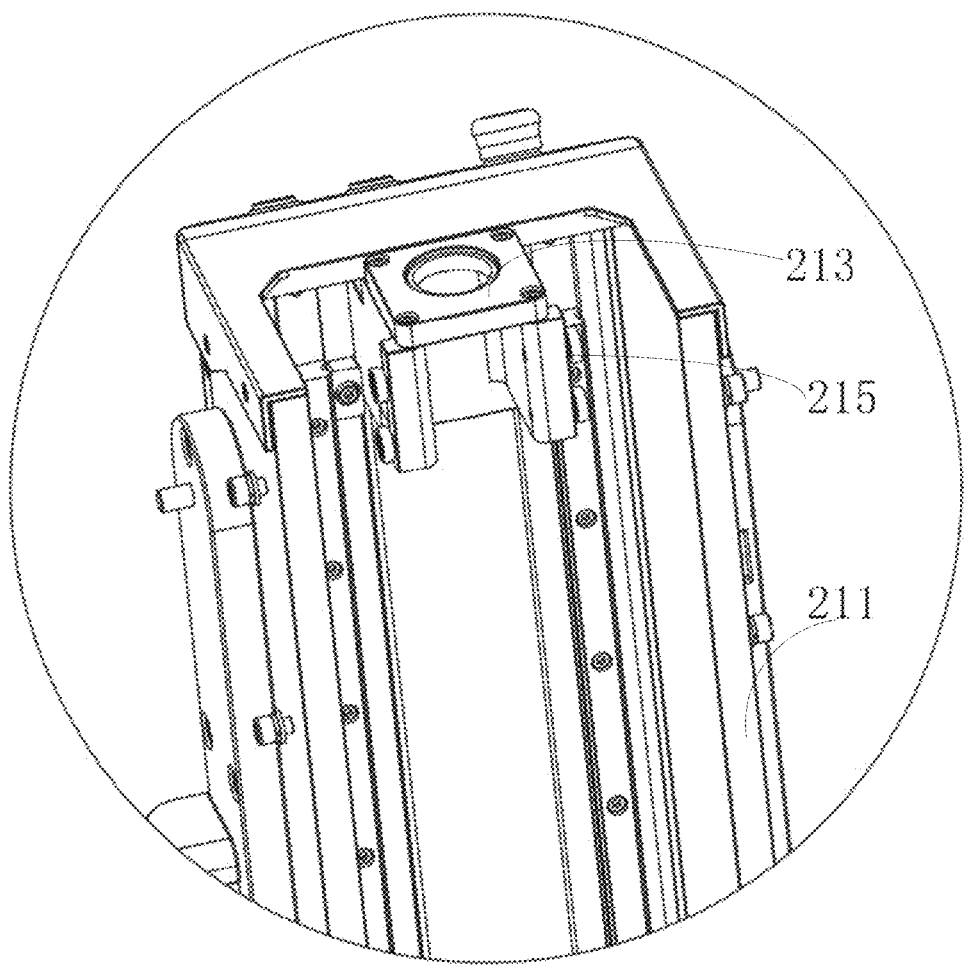
FIG. 8 is an enlarged view of a portion A of FIG. 7.

Referring to FIGS. 7 and 8, in some embodiments, the fixed column 210 is further provided with a plurality of rollers 215 movably mounted to the side ends of the limit seat 213 and partially extend out of the edge of the limit seat 213 and abut against the movable column assembly 220, and the plurality of rollers 215 serve to reduce frictional resistance between the movable column assembly 220 and the fixed column 210.

Figure 9:
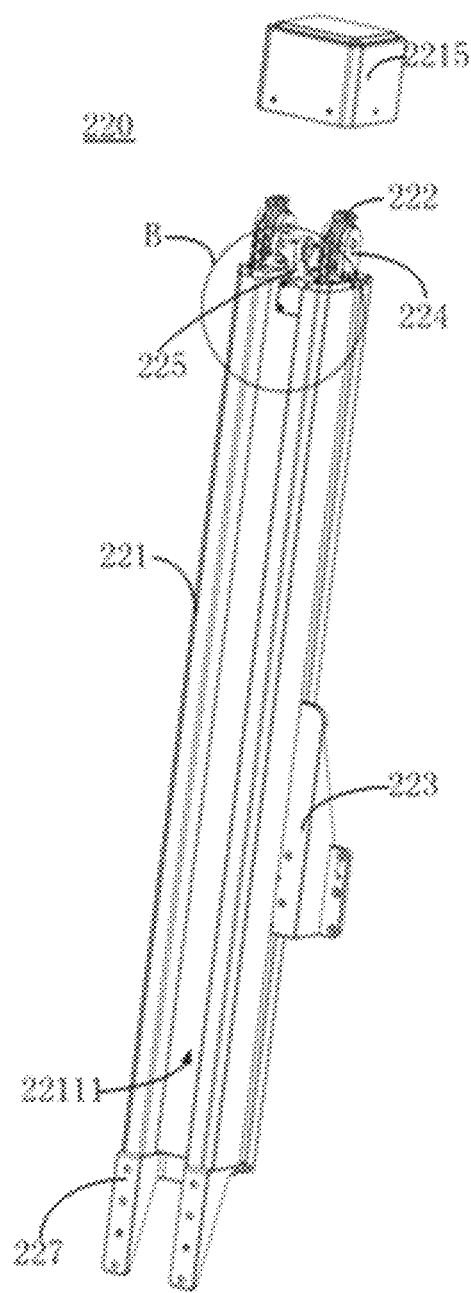
FIG. 9 is an exploded view of the movable column assembly of FIG. 6.

As shown in FIG. 9, the movable column assembly 220 includes a column 221, a traction member 222 and a lifting plate 223, wherein the traction member 222 is mounted to the column 221, one end of the traction member 222 is connected to the first column housing 2112, the other end of the traction member 222 is connected to the lifting plate 223, and the lifting plate 223 is connected to the cross-beam module 300. In this embodiment, the traction member 222 is a chain, one end of which is fixedly connected to the fixing member 2114 of the first column housing 2112, and the other end of which passes through the top of the column 221 and is connected to the lifting plate 223. It is to be understood that the traction member 222 may be a structure other than a chain, for example, a rope or a wire rope, etc. as long as the lifting or lowering of the lifting plate 223 can be performed.

As such, as the drive assembly 230 drives the movable column assembly 220 up or down relative to the fixed column 210, the lifting plate 223 will move relative to the column 221 by the traction member to move the cross-beam module 300 up or down. Here, the cross-beam module 300 is pulled by the traction member 222 to move twice as much as the column 221, i.e. the moving speed of the cross-beam module 300 by the traction member 222 is twice as fast as the moving speed of the column 221. That is, it can be seen that the movement distance of the cross-beam module 300 is twice the movement distance of the column 221 in the same duration. Further, the range of motion of the cross beam is increased, and it is possible to adjust the cross-beam module to almost any height of the column module. For example, when moving the columns up to the highest height, the height of the entire column module may be 2.5 m, in which case the height adjustment range of the cross-beam module may be [0.3 m, 2.1 m]. Thereby, it is ensured that the height of the cross-beam module can be adapted both for the wheel positioning measurement function and for the calibration function of the auxiliary driving system. Here, the traction member can pull the cross-beam module 300 to move in the same direction as the movable column assembly 220.

Figure 10:
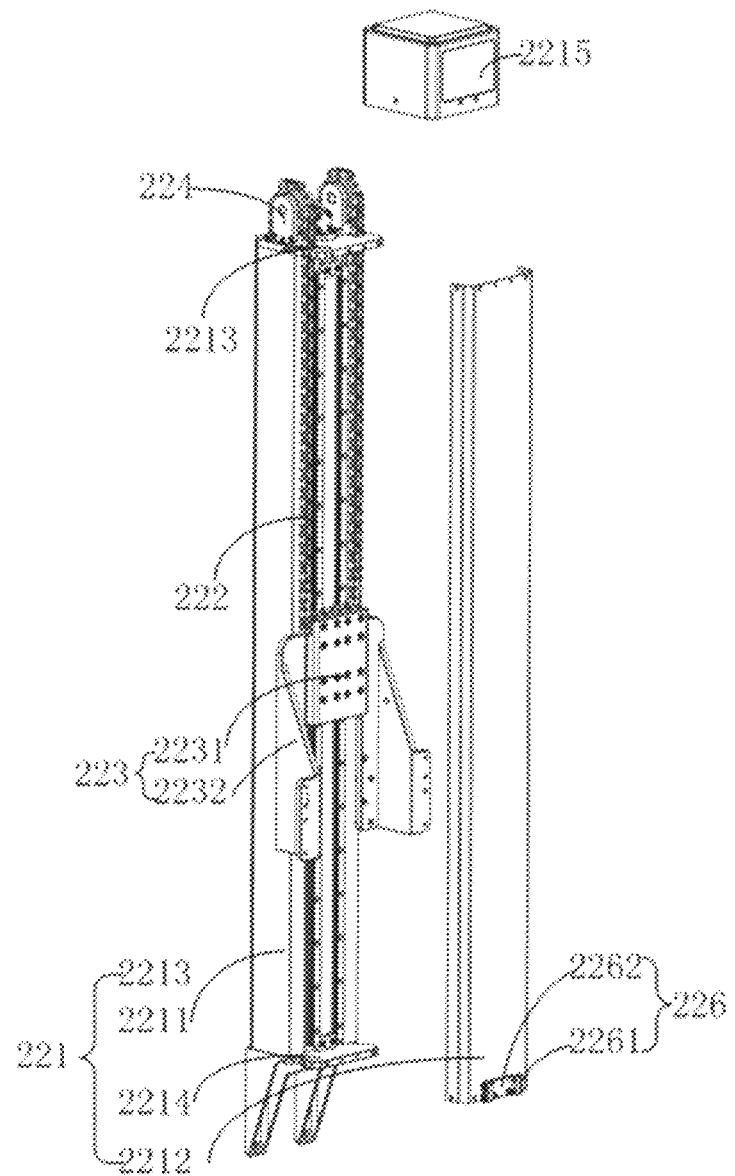
FIG. 10 is a further exploded view of FIG. 9.

As shown in FIG. 10, the column 221 includes a first column housing 2211, a second column housing 2212, a top plate 2213 and a bottom plate 2214, wherein the top plate 2213 is connected to one end of the first column housing 2211 and the second housing 2212, the bottom plate 2214 is connected to the other end of the first column housing 2211 and the second housing 2212, the traction member 222 and the lifting plate 223 are both mounted between the first column housing 2211 and the second housing 2212, the top plate 2213 is provided with a plurality of openings (not shown), and the traction member 222 is connected to the fixed column 210 and the lifting plate 223 via the openings. The first column housing 2211 is provided with a relief groove 22111, the relief groove and the lifting plate 223 are respectively located at two opposite side ends of the first column housing 2211, the column 221 is movably received in the fixed column 210, that is to say, the mobile vertical frame assembly can be sleeved in the fixed column 210, and the relief groove is used for relieving the drive assembly 230 during the lifting or lowering of the column 221.

The lifting plate 223 includes a body plate 2231 connected to the traction member 222, and a connecting plate 2232 connected to either end of the body plate 2231, wherein the connecting plate 2232 is connected to the cross-beam module 300.

Further, the movable column assembly 220 further includes a rotating member 224 mounted to the top plate 2213 of the column 221 around which the traction member 222 is partially wound, and the rotating member 224 is used for reducing friction between the traction member 222 and the column 221.

In this embodiment, the rotating member 224 is a sprocket that cooperates with the chain to more stably lift and lower the movable column assembly 220 relative to the fixed column 210. Of course, the rotating member 224 may be of another structure, and is not limited to the sprocket, so long as it can reduce the friction between the traction member 222 and the body 221, for example, a movable pulley.

In some embodiments, in order to prevent the rotating member 224 from being directly affected by external dust or the like, the column 221 further includes a top cover 2215 that covers the top plate 2213 so that the rotating member 224 is not exposed to the outside. At the same time, the top cover cooperates with the first housing 2211 and the second housing 2212 to shield the traction member 222 from the direct action of the outside.

In some embodiments, the column 221 is provided with a guide structure (not shown) through which the body plate 2231 is directionally movable. The guide structure may be a sliding block, and in this case, the column 221 is provided with a sliding groove, and the sliding block can slide directionally in the sliding groove, and the sliding block is connected to the body plate 2231. The guide structure may be another structure, for example, a combination of a guide bar fixedly mounted at an inner wall of the column 221 and a guide block connected to the body plate 2231.

Figure 11:
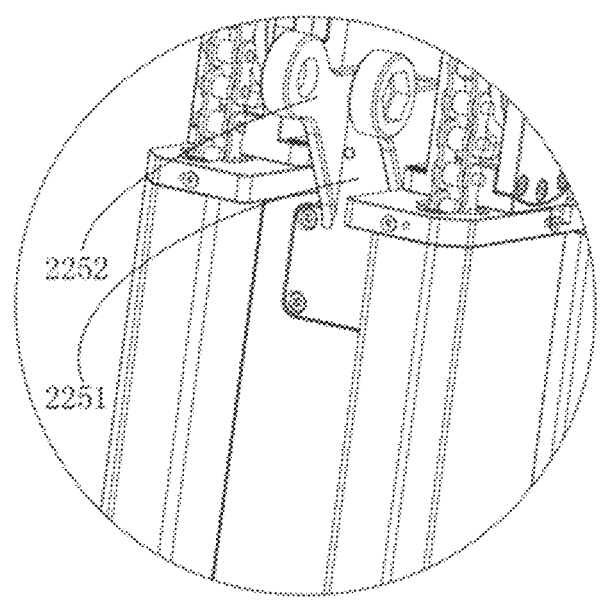
FIG. 11 is an enlarged view of a portion B of FIG. 9.

With reference to FIGS. 9 and 11, in some embodiments, the movable column assembly 220 further includes connecting supports 225 mounted to the top plate 2213 and distributed in an axial direction of the column 221 and away from the fixed column 210. The connecting support 225 is adapted to connect with the drive assembly 230. In this embodiment, the connecting support 225 has a base block 2251 and two symmetrically arranged connecting arm blocks 2252, wherein the base block is connected to the column 221, the two connecting arm blocks 2252 are respectively connected to two ends of the base block 2251, and each of the connecting arm blocks 2252 is provided with a through hole (not shown).

In some embodiments, the movable column assembly 220 further includes a resistance reducing member 226 mounted to the second housing 2212, and the resistance reducing member 226 abuts against an inner wall of the fixed column 210. In this embodiment, the resistance reducing member 226 includes a plurality of wheels 2261 and a mounting block 2262 for mounting the plurality of wheels 2261, and the mounting block 2262 is fixedly mounted to the second housing 2212. When the movable column assembly 220 ascends or descends relative to the fixed column 210, the plurality of wheels 2261 will rollingly rub with the column housing 211, preventing the movable column assembly 220 and the fixed column 210 from interfering with the lifting or lowering of the lifting plate 223 due to excessive frictional resistance.

In some embodiments, the movable column assembly 220 further includes a guide link 227, as shown in FIG. 9, mounted to the column 221, which is connected to the sliding block 2142 of the fixed column 210. As such, driven by the drive assembly 230, the column 221 moves only in an axial direction of the fixed column 210 under the combined action of the guide link 227 and the sliding block 2142.

Figure 12:
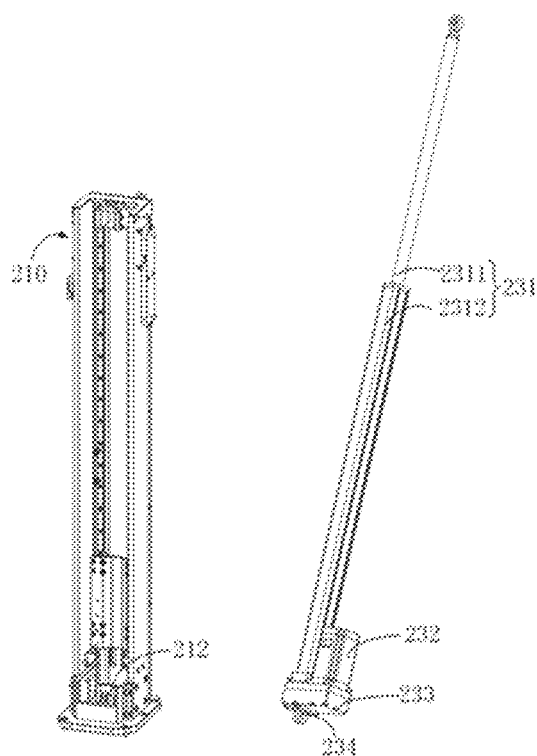
FIG. 12 is a schematic diagram of another angle of FIG. 7.

As shown in FIG. 12, the drive assembly 230 includes a pusher 231, wherein the pusher 231 includes a push rod 2311 and a body 2312, the push rod 2311 is movably mounted inside the body 2312, i.e., the push rod 2311 can be telescopic relative to the body 2312, and one end of the push rod 2311 away from the body 2312 passes through the limit seat 213 and is connected to the movable column assembly 220. When the push rod 2311 gradually extends out of the body 2312, the push rod 2311 will gradually push the movable column assembly 220 to extend out of the fixed column 210, and when the push rod 2311 retracts back into the body 2312, the push rod 2311 will bring the movable column assembly 220 to retract into the fixed column 210. It should be appreciated that the pusher 231 may be a column or a hydraulic column, although other configurations are possible, in which case the push rod 2311 is a push rod of the cylinder or hydraulic cylinder and the body 2312 is a column of the cylinder or hydraulic cylinder.

Further, the drive assembly 230 further includes a driving motor 232 and a conversion box 233, wherein the driving motor 232 has an output shaft connected to the conversion box 233, the body 2312 is connected to the conversion box 233, and the conversion box 233 is connected to the fixed column 210. When the output shaft of the driving motor 232 rotates, the conversion box 233 drives the push rod 2311 to push the movable column assembly 220 to extend out of or retract into the fixed column 210. It can be understood that the conversion box 233 serves to convert the rotation of the output shaft of the driving motor 232 into the linear motion of the push rod 2311. In this embodiment, the conversion box 233 is a gear box, a plurality of gears for transmission are provided inside the gear box, the push rod 2311 is a screw, the output shaft of the driving motor 232 is connected to one gear of the gear box, and the other gear of the gear box intermeshes with the screw.

The drive assembly 230 further includes a hinged plate 234 mounted at an end of the conversion box 233 facing the fixed support 212, with which the hinged plate 234 is hinged. It can be appreciated that the hinged plate 234 is hinged to the fixed support 212 such that the hinged plate 234 causes the conversion box 233 to rotate slightly with respect to the fixed support 212, allowing the pusher 231 to be adaptively and flexibly adjusted during use, while a central axis of the pusher 231 will remain parallel with respect to the central axis of the fixed column 210, under the restriction of the limit seat 213, to avoid jamming when the pusher 231 pushes the movable column assembly 220.

In some embodiments, the vehicle measurement device 900 further includes a control system mounted to the fixed column 210 for controlling the drive assembly 230 to drive the movable column assembly 220 up or down relative to the fixed column 210. In this embodiment, the control system includes a power source, a motor driver, and a switch button. The power source is connected to the motor driver for driving and controlling the operation of the driving motor 232 and the switch button for controlling the lifting or lowering of the movable column assembly 220 relative to the fixed column 210, respectively. In some embodiments, the control system further includes an emergency control button for instructing the control system to power down or for instructing the control system to stop outputting control commands to avoid a hazard in case of an emergency. In some embodiments, the control system further includes a lifting button for receiving a user operation and transmitting a user lift command to the motor driver to control the lift operation of the driver to drive the push rod. The lifting button and the emergency control button may be provided on the column housing of the fixed column, and the height thereof may be set to facilitate user operation and enhance user experience.

With the above-mentioned structure, under the action of the pusher 231, the movable column assembly 220 can extend or retract into the fixed column 210, and if the overall height of the column 221 approaches the overall height of the fixed column, the overall minimum height of the column module 200 is the height of the fixed column, and the maximum height approaches the sum of the axial lengths of the fixed column 210 and the column 221, i.e. approximately twice the height of the fixed column. Of course, the maximum height from the ground at which the lifting plate 223 can ascend is approximately close to the maximum height of the column module 200, and the minimum height from the ground at which the lifting plate 223 can descend is the height from the ground at which the column housing 221 approaches the base 2111 when the column housing 221 is completely retracted into the fixed column 210. Accordingly, a user can adjust the height of the column module 200 as needed so that the cross-beam module 300 has different height from the ground, so that the column module 200 can simultaneously satisfy the height required for four-wheel positioning and Advanced Driving Assistance System (ADAS).

Figure 13:
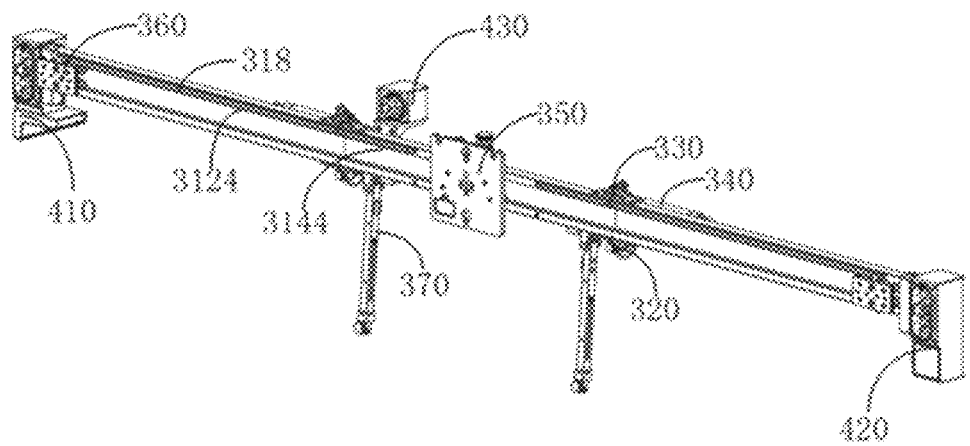
FIG. 13 is a structural schematic diagram of the cross-beam module and camera assembly of FIG. 1.
Figure 14:
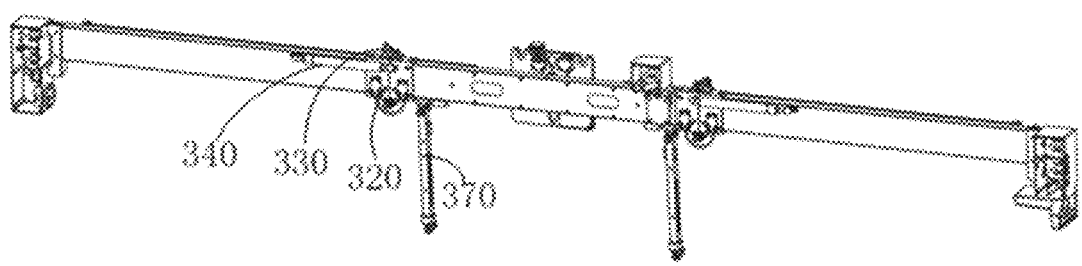
FIG. 14 is a schematic diagram of another perspective of FIG. 13.
Figure 15:
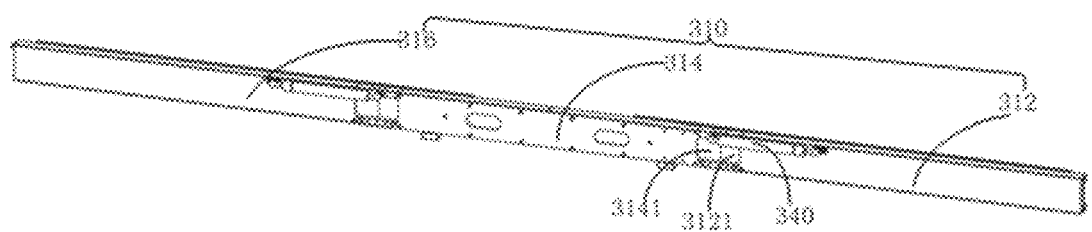
FIG. 15 is a partial structural schematic diagram of FIG. 13.

As shown in FIGS. 13-15, the cross-beam module 300 includes a cross beam 310 including a left cross beam portion 312, a connecting portion 314 having one end pivotably connected to the left cross beam portion 312, and another end pivotably connected to the right cross beam portion 312, and a right cross beam portion 316, the connecting portion 314 being supported by the lifting plate 223. As such, the cross beam 310 will have an unfolded state and a folded state, and when the cross beam 310 is in the unfolded state, the left cross beam portion 312 and the right cross beam portion 316 will both rotate to be at a horizontal line with the connecting portion 314; on the contrary, when the cross beam 310 is folded, the left cross beam portion 312 and the right cross beam portion 316 will both have an included angle with the connecting portion 314, and the included angle is greater than 0 deg, and less than or equal to 90 deg. It can be appreciated that the cross beam 310 may be mounted directly on the cross beam 310, for example by means of hooks or magnets hanging directly on the cross beam 310. The cross beam 310 may be used for mounting calibration elements, whether in an unfolded or folded state. In the unfolded state of the cross beam 310, the calibration elements may be mounted at various locations on the cross beam 310 to meet calibration requirements. The cross beam 310, in its folded state, may be used for mounting the calibration elements together with the left cross beam portion 312 and the right cross beam portion 316.

Thus, when the vehicle measurement device 900 is not needed, the space taken up by the vehicle measurement device 900 can be reduced by rotating both the left cross beam portion 312 and the right cross beam portion 316 relative to the connecting portion 314 so that the cross beam 310 is in a folded state. Under the influence of gravity, both the left cross beam portion 312 and the right cross beam portion 316 will naturally sag, and the angle between them and the connecting portion 314 approaches 90 deg., which minimizes the space taken up by the vehicle measurement device 900.

It should be appreciated that a hinge structure, which may be a combination of a pin shaft and a pin hole, is provided between the left cross beam portion 316 and the connecting portion 314, and the hinge structure may be a combination of a pin shaft and a pin hole, and in particular, the left cross beam portion 312 is provided with a first pin hole, and the connecting portion 314 is provided with a second pin hole, and the pin shaft is inserted through the first pin hole and the pin hole, so that the left cross beam portion 312 and the connecting portion 314 are pivotable. Also, the pin hole and the pin shaft may be hinged between the right cross beam 316 and the connecting portion 314. Of course, the hinge structure may be other structures as long as the left cross beam 312 and the connecting portion 314 are pivotable and the right cross beam 316 and the connecting portion 314 are pivotable.

As shown in FIGS. 13-14, in some embodiments, the left cross beam portion 312 is hingedly connected to the connecting portion 314 and the right cross beam portion 316 is hingedly connected to the connecting portion 314 using a hinge assembly. That is, the cross-beam module 300 includes hinge assemblies 320, one group of the hinge assemblies 320 is mounted between the left cross beam portion 312 and the connecting portion 314, and another group of the hinge assemblies 320 is mounted between the right cross beam portion 316 and the connecting portion 314.

Figure 16:
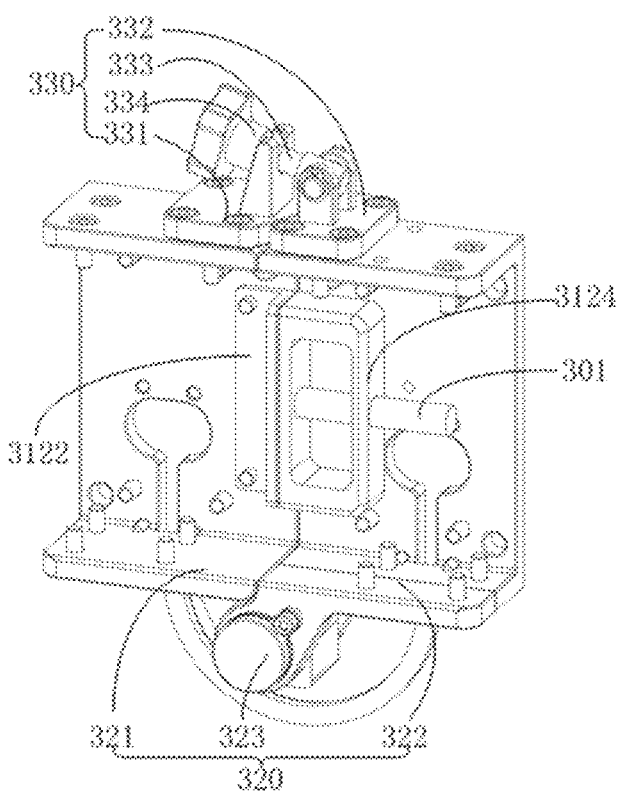
FIG. 16 is a structural diagram of the hinge assembly and locking assembly of FIG. 13.

As shown in FIG. 16, the hinge assembly 320 includes a first fixed seat 321, a second fixed seat 322, and a pivot shaft 323, wherein the first fixed seat 321 is hinged to the second fixed seat 322 via the first fixed seat 321, such that the first fixed seat 321 and the second fixed seat 322 rotate with each other through the pivot shaft 323. In this embodiment, the first fixed seat 321 is mounted to the left cross beam 312, the second fixed seat 322 is mounted to the connecting portion 314, and the pivot shaft 323 is located at an end of the cross beam 310 facing the base module 100. The shape of the first fixed seat 321 and the second fixed seat 322 is approximately of a semi-frame shape, and the first fixed seat 321 and the second fixed seat 322 in the semi-frame shape can quickly cover the cross beam 310 to achieve quick mounting. In order to accurately position the mounting positions of the first fixed seat 321 and the second fixed seat 322, the first fixed seat 321 is provided with a plurality of first positioning studs (not shown), the second fixed seat 322 is provided with a plurality of second positioning studs (not shown), the left cross beam portion 312 is provided with a plurality of first positioning holes, the right cross beam portion 316 is provided with a plurality of second positioning holes, each of the first positioning studs is correspondingly inserted into one of the first positioning holes, and each of the second positioning studs is correspondingly inserted into one of the second positioning holes to achieve the quick mounting of the hinge assembly to the cross beam 310.

Figure 18:
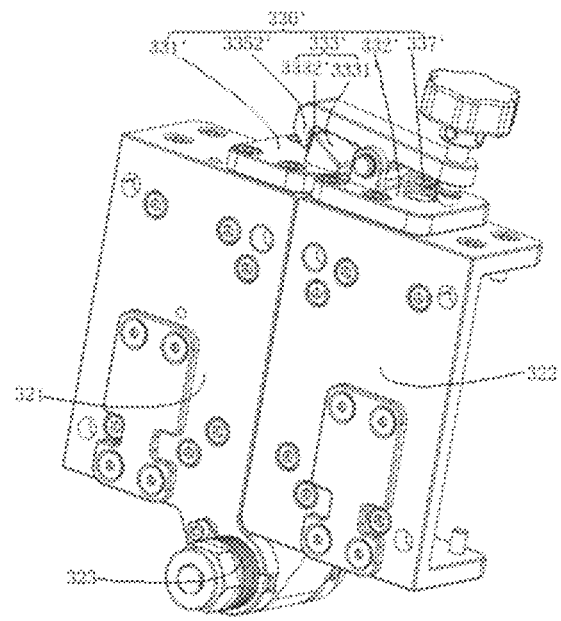
FIG. 18 is a structural schematic diagram of another embodiment of the hinge assembly and locking assembly of FIG. 13.
Figure 19:
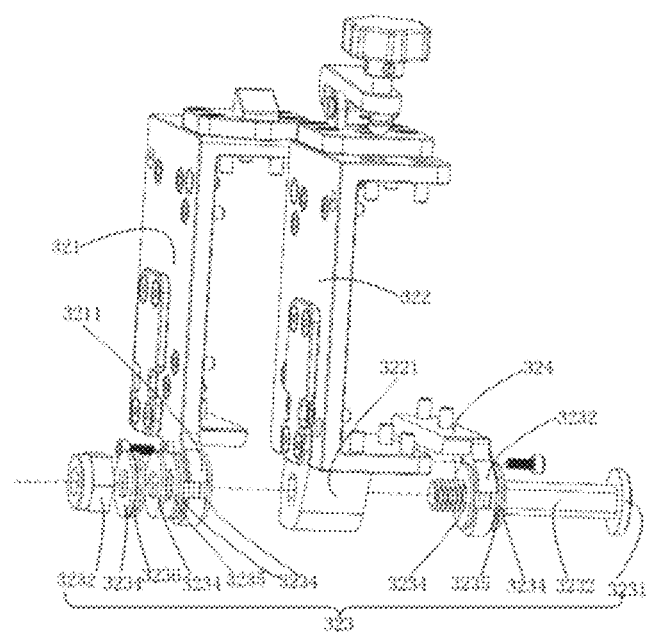
FIG. 19 is an exploded view of the structure of FIG. 18.

As shown in FIGS. 18-19, in some embodiments, the first fixed seat 321 is provided with a first coupling sleeve 3211, the second fixed seat 322 is provided with a second coupling sleeve 3221, and the first coupling sleeve 3211 and the second coupling sleeve 3221 are coupled by a damping pivot shaft 323 such that the first fixed seat 321 and the second fixed seat 322 can rotate relative to each other.

In some embodiments, the damping pivot shaft 323 includes a first pivot shaft 3232 provided with a fixed end 3231 and a locking nut 3233, the first coupling sleeve 3211 and the second coupling sleeve 3221 are both sleeved on the first pivot shaft 3221, and the locking nut 3233 is in threaded connection with the end of the first pivot shaft 3232. In this embodiment, the second coupling sleeve 3221 is arranged between the first coupling sleeve 3211 and the fixed end 3231 of the first pivot shaft.

A first spacer 3234 is provided between the fixed end 3231 of the first pivot shaft and the second coupling sleeve 3221, between the first coupling sleeve 3211 and the second coupling sleeve 3221, and between the locking nut 3233 and the first coupling sleeve 3211, wherein the first spacer 3234 is used for spacing and protecting the mounting surfaces of the first coupling sleeve 3211 and the second coupling sleeve 3221.

In some embodiments, a second spacer 3235 is provided between the locking nut 3233 and the first spacer 3234, and between the fixed end 3231 of the first pivot shaft and the first spacer 3234, the second spacer 3235 is fixed to the first coupling sleeve 3211; and the second spacer 3535 is used for positioning a part of the first spacer 3234 to prevent the first spacer 3234 from moving axially.

A third spacer 3236 is provided between the first coupling sleeve 3211 and the locking nut 3233, and specifically, the third spacer 3236 is provided between the locking nut 3233 and a second spacer 3235, and the third spacer 3236 is used for providing a pre-pressing elastic force to ensure that the locking nut 3233 does not cause damping failure of the damping pivot shaft due to loosening during long-term rotation work of the damping pivot shaft.

In some embodiments, the first spacer 3234 is also provided between the locking nut 3233 and the third spacer 3236 and between the third spacer 3236 and the second spacer 3235.

In some embodiments, stripped holes are provided in the middle of the first spacer 3234, the second spacer 3235 and the third spacer 3236 which are all positioned on the first pivot shaft 3232 through their own stripped holes.

In some embodiments, the damping pivot shaft 323 is a metal damping pivot shaft structure, wherein the first shaft 3232, the locking nut 3233, the first spacer 3234, the second spacer 3235, and the third spacer 3236 are all metal structures.

In some embodiments, the first spacer 3234 is a friction damping washer, the second spacer 3235 is a positioning washer, and the third spacer 3236 is a bowl-shaped resilient washer.

In some embodiments, to further enhance the damping of the damping pivot shaft 323, the hinge assembly 320 further includes an adjustment plate 324 having one end fixed to the first fixed seat 321 and the other end include a third coupling sleeve 3241 sleeved on the first shaft 3232, and the third coupling sleeve 3241 is provided between a fixed end 3231 of the first shaft and the second coupling sleeve 3221.

It should be noted that a first spacer 3234 and a second spacer 3235 located between the fixed end 3231 of the first pivot shaft and the second coupling sleeve 3221 are both provided between the third coupling sleeve 3241 and the fixed end 3231 of the first pivot shaft, and the second spacer 3235 is fixed to the third coupling sleeve 3241.

It can be appreciated that a first spacer 3234 is provided between the third coupling sleeve 3241 and the second coupling sleeve 3221 is provided between the third coupling sleeve 3241 and the second coupling sleeve 3221.

The damping pivot shaft 323 is provided so that the first fixed seat 321 can be rotated relative to the second fixed seat 322 by an external force.

Figure 17:
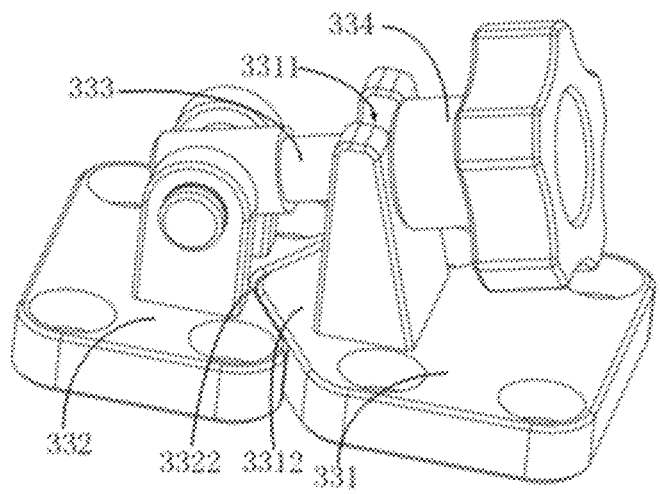
FIG. 17 is a schematic diagram of another view of the locking assembly of FIG. 16.

As shown in FIG. 17, in some embodiments, the cross-beam module 300 further includes a locking assembly 330 mounted to the hinge assembly 320 for locking the first fixed seat 321 with the second fixed seat 322 to place the cross beam 310 in an unfolded state. Specifically, the locking assembly 330 includes a first fixed block 331 mounted to the first fixed seat 321, a second fixed block 332 mounted to the second fixed seat 322, a rotating rod 333 having one end rotatably mounted to the second fixed block 332 and the other end mounted to a clamping member 334, and the clamping member 334. The first fixed block 331 is provided with a slot opening 3311 for inserting the rotating rod 333. When the rotating rod 333 is rotated to be inserted into the slot opening 3311, the clamping member 334 abuts against an edge of the slot opening 3311 so that the first fixed block 331 and the second fixed block 332 are in the same horizontal plane to lock the first fixed seat 321 and the second fixed seat 322.

Further, in order to enable the first fixed block 331 and the second fixed block 332 to be accurately butted, while ensuring that the left cross beam portion 312 and the connecting portion 314 are accurately spliced, the first fixed block 331 is provided with a protruding portion 3312, the second fixed block 332 is provided with a recessed portion 3322, and the protruding portion 3312 and the recessed portion 3322 cooperate with each other. In this embodiment, the protruding portion 3312 has a V-shape, and the recessed portion 3322 has a V-shaped groove.

When the protruding portion 3312 and the recessed portion 3322 are oppositely inserted, the first fixed seat 321 has been moved to a position cooperating with the second fixed seat 322, and the first fixed seat 321 has been rotated to an extreme position, at this time, the rotating rod 333 is rotated to be inserted into the slot opening 3311, so that the clamping block 334 abuts against the first fixed block 321, thereby locking the left cross beam portion 312 and the connecting portion 314, and likewise, the right cross beam portion 316 and the connecting portion 314 are also locked using the locking assembly.

Figure 20:
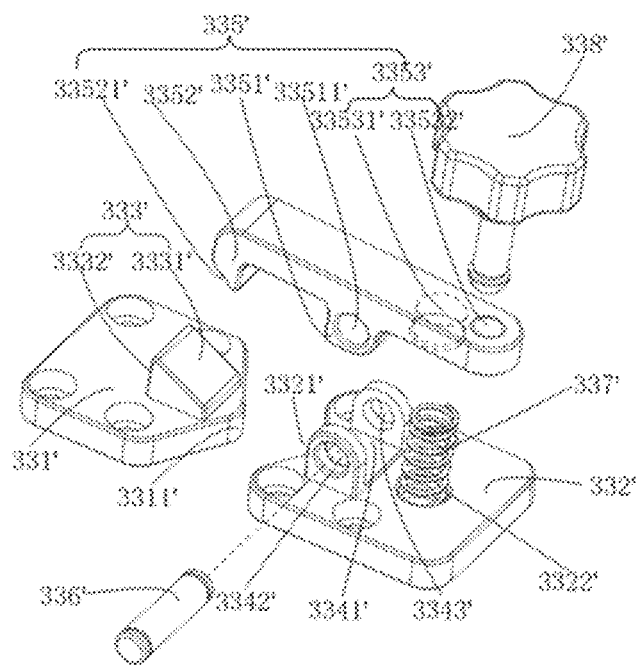
FIG. 20 is an exploded view of the locking assembly of FIG. 18.

In other embodiments, the locking assembly 330 described above may be of the following structure;

As shown in FIGS. 18-20, the locking assembly 330 includes a first fixed block 331' mounted to the first fixed seat 321, a second fixed block 332' mounted to the second fixed seat 322', a locking block 333' fixed to the first fixed block 331', and a rotating body 335' rotatably mounted to the second fixed block 332', and an resilient member 337'. The locking block 333' is mounted to the first fixed seat 321', the rotating body 335' is rotatably mounted to the second fixed seat 322' and has one end used for engaging (clamping or disengaging) with the locking block 333' and the other end of the rotating body 335' connected to the resilient member 337' provided between the second fixed seat 322' and the other end of the rotating body 335', and the resilient member 337' is used for providing a restoring force to clamp the rotating body 335' with the locking block 333'. The second fixed seat 322' can be locked and unlocked in the above manner.

In an embodiment of the present application, the desired position refers to the position of the second fixed seat 322' when the second fixed seat 322' is flush with the first fixed seat 321'.

It can be appreciated that locking the second fixed seat 322' means limiting the rotation of the second fixed seat 322' with respect to the first fixed seat 321' and unlocking the second fixed seat 322' means that the second fixed seat 322' is rotatable with respect to the first fixed seat 321.

Specifically, the second fixed block 332' is provided with a rotating seat 334' provided with a mounting space 3341' having either end respectively provided with a first mounting hole 3342' and a second mounting hole 3343', a lower portion 3351' of the rotating body 335' is placed in the mounting space 3341', the lower portion 3351' of the rotating body 335' is provided with a third mounting hole 33511', and the second pivot shaft 336' passes through the first mounting hole 3342', the third mounting hole 33511' and the second mounting hole 3343' successively, so that the rotating body 335' can rotate relative to the second fixed seat 322.

It can be appreciated that since the lower portion 3351' of the rotating body 335' is rotatable with respect to the rotating seat 334' in the mounting space 3341', and the lower portion 3351' of the rotating body has a circular arc surface.

In some embodiments, the locking block 333' includes a first inclined surface 3331' and a second inclined surface 3332', a first end of the rotating body 335' has a hook 3352', a second end 3353' of the rotating body 335' is used for connecting the resilient member 337', the first inclined surface 3331' acts on the hook 3352' for pushing the hook 3352' to deform the resilient member 337' when the first fixed seat 321' approaches the second fixed seat 322', and the second inclined surface 3332' is used for clamping with the second inclined surface 3332' under the restoring force of the resilient member 337'.

It can be appreciated that in order to ensure the implementability of the solution, the hook 3352' is disengaged from the first inclined surface 3331' when the rotating body 335' is not subjected to an external force and the second fixed seat 322' is flush with the first fixed seat 321'.

It should be noted that the lower portion 3351' of the rotating body 335' is located between the first end of the rotating body 335' and the second end of the rotating body.

For convenience of description, according to an embodiment of the present application, the horizontal plane on which the first block 331' is located is regarded as an x-direction and a direction perpendicular to the x-direction as a y-direction.

In some embodiments, the first inclined surface 3331' includes an angle of 30 deg, in the x-direction.

In some embodiments, the second inclined surface 3332' includes an angle in a range of 0 to 5 degrees in the y-direction.

In some embodiments, to make the first inclined surface 3331' easier to push against the hook 3352', the hook 3352' includes a third inclined surface 33521' for contacting the first inclined surface 3331'.

The third inclined surface 33521' is provided so that the hook 3352' is in line contact with the first inclined surface 3331' to reduce friction between the hook 3352' and the first inclined surface 3331', so that the first inclined surface 3331' is easier to push against the hook 3352'.

In some embodiments, the third inclined surface 3351' is parallel to the first inclined surface 3331' when the hook 3352' is clamped with the second inclined surface 3332'.

In some embodiments, the resilient member 337' is a spring.

In some embodiments, in order to prevent the resilient member 337' from springing out during the rotation of the rotating body 335', the second end 3353' of the rotating body 335' and the second fixed block 332' are respectively provided with a first mounting groove 33531' and a second mounting groove 3322', and the resilient member 337' is arranged between the first mounting groove 33531' and the second mounting groove 3322'.

It can be appreciated that the resilient member 337' is in its original long or compressed state when the hook 3352' is clamped with the locking block 333'.

It should be noted that in order to ensure the implementability of the solution, when the rotating body 335' is not in contact with the locking block 333', that is to say, when the resilient member 337' is not elastically deformed, the hook 3352' should be located above the second fixed block 332', and an included angle between an upper end face or a third inclined surface of the rotating body and the plane where the second fixed block 332' is located is a pre-set angle, and the pre-set angle can be set as actually required to ensure that the hook 3352' can contact the first inclined surface 3331' when the second fixed seat 322 rotates close to the first fixed seat 321.

In some embodiments, in order to prevent the rotating body 335' from rotating under an external force after the hook 3352' is clamped with the locking block 333', the locking assembly 320' further includes a locking knob 338', the second end of the rotating body is provided with a fourth mounting hole 33532', the locking knob 338' is threadedly connected to the fourth mounting hole 33532', and after the hook is clamped with the locking block 333', the locking knob 338' is tightened until the end of the locking knob 338' abuts against the second fixed block 332'.

In some embodiments, the end of the locking knob 338' is a circular arc surface.

It should be noted that the first mounting groove 33531' is provided near the middle portion 3351' of the rotating body, and the fourth mounting hole 33532' is provided away from the middle portion 3351' of the rotating body.

For convenience of description, the hinge assembly 320 and the locking assembly 330 at a junction of the connecting portion 314 and the right cross beam 316 are described as examples, and the direction of rotation near the second fixed seat 322' is a counterclockwise direction, and the direction of rotation away from the second fixed seat 322 is a clockwise direction.

Figure 21:
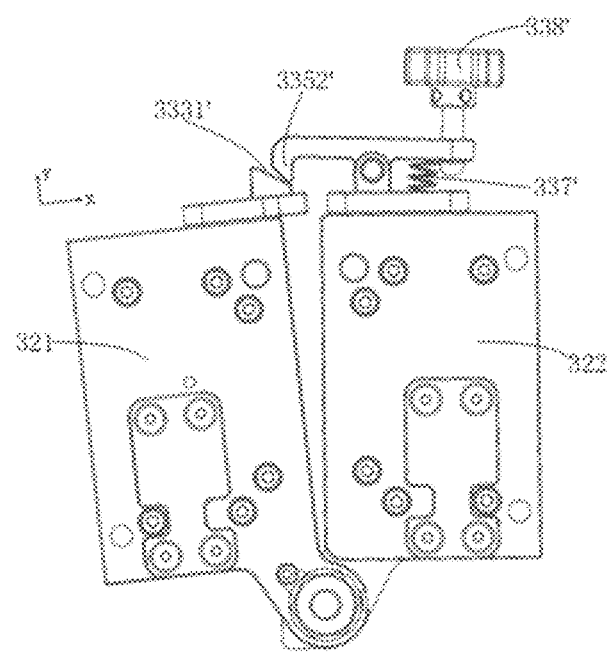
FIG. 21 is a schematic diagram of the second hinge of FIG. 18 not flush with the first hinge.
Figure 22:
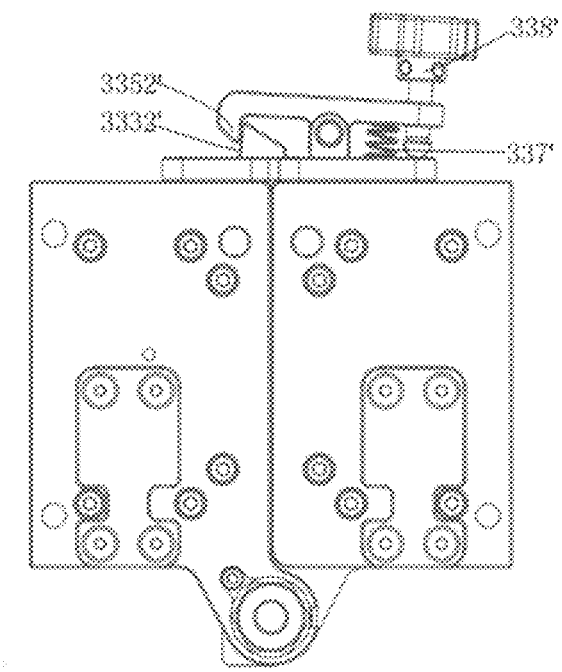
FIG. 22 is another state diagram of FIG. 21.

In particular implementation, the first fixed seat 321' is pushed to rotate the first fixed seat 321' in a direction close to the second fixed seat 322' until the hook 3352' abuts against the first inclined surface 3331', as shown in FIG. 21; the first fixed seat 321' is pushed towards the second fixed seat 322', the first inclined surface 3331' pushes against the hook 3352' under the push of the first fixed seat 321', the hook 3352' rotates clockwise under the action of the first inclined surface 3331' and compresses the resilient member 337', as shown in FIG. 22, until the first fixed seat 321' is flush with the second fixed seat 322', the rotating body 335' rotates counterclockwise under the action of the restoring force of the resilient member 337', so that the hook 3352' is clamped with the second inclined surface 3332'; the locking knob 338' is tightened until the end of the locking knob 338' abuts against the second fixed block 332' to complete locking; when it is necessary to unlock, i.e., the first fixed seat 322' needs to rotate in a direction away from the second fixed seat 322', the locking knob 338' is unscrewed so that the end of the locking knob 338' is at a pre-set distance from the second fixed block 332'; by pressing the locking knob 338', the rotating body 335' is rotated in the clockwise direction until the hook 3352' is disengaged from the second inclined surface 3332', at which time the first fixed seat 321' can be rotated in the clockwise direction. It can be appreciated that the predetermined distance is greater than the distance of the end of the hook 3352' from the top of the locking block 3332' when the hook 3352' is clamped with the second inclined surface 3332'.

Referring again to FIG. 16, in some embodiments, in order to accurately know whether the left cross beam portion 312 and the right cross beam portion 316 are rotated to an extreme position connected to the connecting portion 314, the cross-beam module 300 further has a detection sensor 301 mounted to the cross beam 310 for detecting whether the left cross beam portion 312 and the right cross beam portion 316 are closed to the connecting portion 314. In this embodiment, the detection sensor 301 is a proximity sensor, an end portion of the left cross beam 312 is provided with a first mounting groove 3121, an end portion of the connecting portion 314 is provided with a second mounting groove 3141, the left cross beam 312 is mounted with a stopping block 3122 at the first mounting groove 3121 near the connecting portion 314 mounted with a support 3142 in the second mounting groove 3141, and the proximity switch is supported by the support 3142. When the left cross beam portion 312 is rotated to a level with the connecting portion 314, the proximity switch will detect that the stopping block 3122 is in place, confirming that the left cross beam portion 312 has been rotated to an extreme position locked with the connecting portion 314. In this embodiment, the first mounting groove 3121 is covered by the first fixed seat 321 without being exposed to the outside, and the second mounting groove 314 is covered by the second fixed seat 322 without being exposed to the outside, so that it is more advantageous to create a detection environment of the detection sensor to prevent the detection from being abnormal due to strong outside illumination. Similarly, a structure similar to the first mounting groove 3121, the second mounting groove 3141, the stopping block 3122, and the proximity switch and the like is provided between the right cross beam portion 316 and the connecting portion 314 to determine whether the right cross beam portion 316 is rotated to an extreme position to be connected to the connecting portion 314.

Referring again to FIG. 14, in some embodiments, the cross-beam module 300 further includes a buffer 340 mounted to the cross beam 310 for slowing the rotational speed of the left cross beam portion 312 and the right cross beam portion 316 relative to the connecting portion 314. In this embodiment, the buffer 340 is a gas spring having one end connected to the left cross beam 312 and the other end connected to the connecting portion 314. As such, as the cross beam 310 is collapsed, the left cross beam portion 312 rotates relative to the connecting portion 314, at which time the left cross beam portion 312 will slowly move downward in a direction toward the ground until it moves to an extreme position, preventing the left cross member 312 suddenly descending to the ground to aggravate the loss of the hinge assembly 320. It should be appreciated that the buffer 340 is not limited to the gas spring described above, but may be other structures, such as a tension spring or an apron, etc. as long as a slowing down of the left cross beam 312 toward the base module 100 is achieved.

In some embodiments, the connecting portion 314 is provided with a first sliding groove 3144, the left cross beam portion 312 and the right cross beam portion 316 are provided with a second sliding groove 3124, two of the second sliding grooves 3124 are respectively located at two ends of the first sliding groove 3144, and the first sliding groove 3144 communicates with the two second sliding grooves 3144.

In order to control the position of the calibration elements on the cross-beam module 300 more accurately to improve the accuracy of an ADAS calibration, the cross-beam module 300 further includes a hanging mechanism mounted to the cross beam 310 for mounting the calibration elements.

Figure 23:
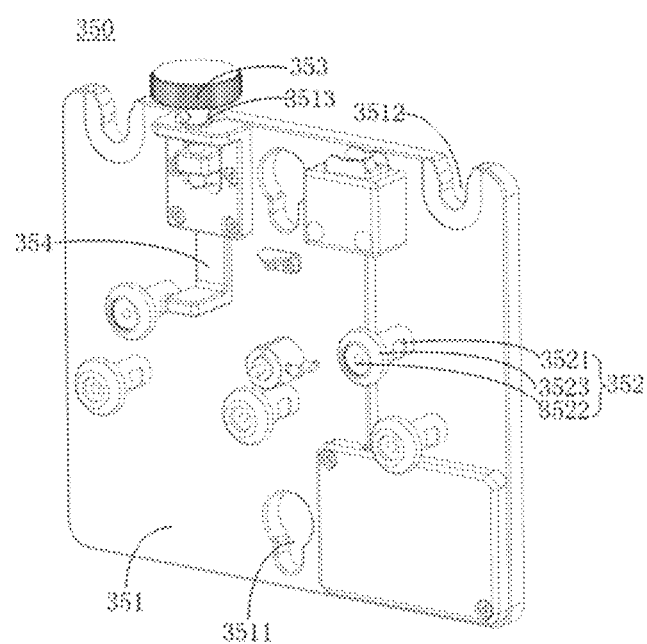
FIG. 23 is a schematic diagram of the main sliding plate assembly of FIG. 13.

As shown in FIG. 23, the hanging mechanism includes a main sliding plate assembly 350 mounted to the cross beam 310. The cross beam 310 is reciprocally movable in an axial direction of the cross beam 310. Specifically, the main sliding plate assembly 350 includes a main sliding plate 351 and at least two rolling members 352, wherein one end of the at least two rolling members 352 is mounted to the main sliding plate 351, and the other end of the at least two rolling members 352 is mounted in the first sliding groove 3144. As such, the main sliding plate 351 can slide within the first sliding groove 3144 via the rolling member 352 to provide different hanging positions for the calibration element. In this embodiment, the main sliding plate 351 is provided with two gourd-shaped mounting holes 3511, wherein the two mounting holes 3511 are symmetrically distributed and are used for a user to mount the calibration element, and the mounting can be achieved by means of a hook or the like. Further, the main sliding plate 351 is also provided with arc holes 3512, the number of the arc holes 3512 is two, two arc holes 3512 are symmetrically distributed, and the arc holes 3512 can also be used for hanging the calibration element.

The rolling member 352 includes a connecting rod 3521, a bearing 3522 and a wheel sleeve 3523, wherein one end of the connecting rod 3521 is fixedly connected to the main sliding plate 351, the other end of the connecting rod 3521 is connected to the bearing 3522, and the wheel sleeve 3523 is sleeved on the bearing 3522. As such, when the main sliding plate 351 is pushed, the bearing 3522 and the wheel sleeve 3523 will roll relative to the connecting rod 3521, thereby achieving movement of the main sliding plate 351.

It should be appreciated that although the above-described embodiment mentions that the mounting holes 3511 have a shape of a gourd shape and a number of two, the shape and the number of the mounting holes 3511 are not limited thereto as long as the calibration element can be hung. Also, the number of the arc holes 3512 is not limited to the above-mentioned two.

Further, the main sliding plate assembly 350 includes a screw 353 and a stopper 354, the main sliding plate 351 is provided with a threaded hole 3513, the screw 353 is screwed to the threaded hole 3513, and the screw 353 is connected to the stopper 354. In this embodiment, the main sliding plate 351 is provided with a mounting portion on which the threaded hole 3513 is provided. One end of the screw 353 is a nut, the other end of the screw 353 is a screw having threads, and an outer surface of the screw has threads, and the screw passes through the threaded hole 3513 and is fixedly connected to the stopper 354.

As such, when the screw 353 is screwed in the first direction, the stopper 354 gradually moves toward a groove wall of the first sliding groove 3144 and abuts, so that the main sliding plate 351 is in a locked state, and at this time, the main sliding plate 351 cannot move freely, and it can effectively ensure that the position of the calibration element does not change when performing ADAS calibration; when the screw 353 is screwed in the second direction, the stopper 354 gradually moves away from the groove wall of the first slide groove 3144 so that the main sliding plate 351 is in an unlocked state, at which time the main sliding plate 351 can slide along the first slide groove 3144. It should be appreciated that the first direction and the second direction are two opposite directions, e.g. the first direction is a clockwise direction while the second direction is a counterclockwise direction.

Figure 24:
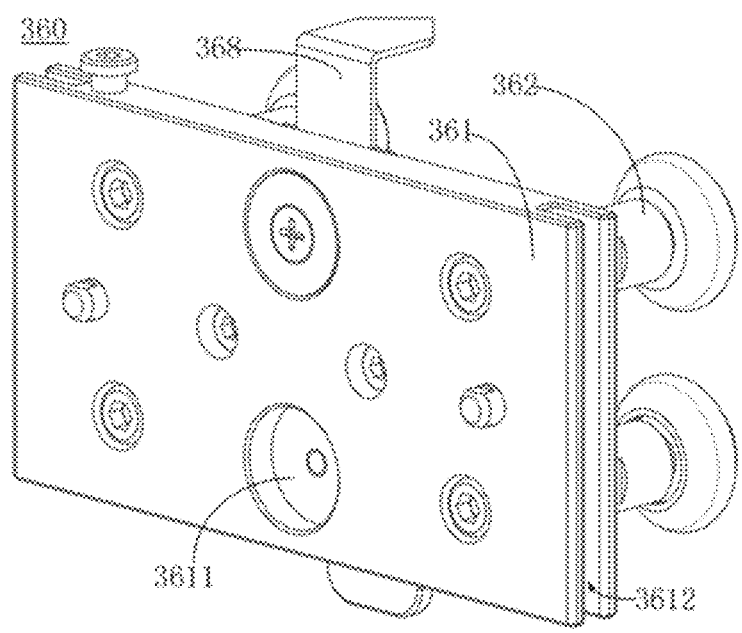
FIG. 24 is a structural schematic diagram of the secondary sliding plate assembly of FIG. 13.
Figure 25:
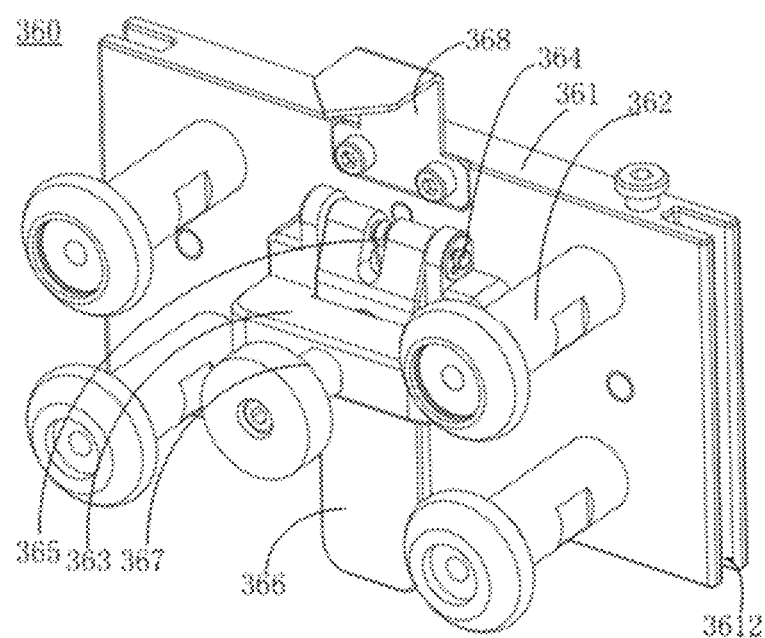
FIG. 25 is a schematic diagram of another view of FIG. 24.

As shown in FIGS. 24-25, in some embodiments, the hanging mechanism further includes two secondary sliding plate assemblies 360 mounted to the secondary sliding plate 3124 and slidable thereon. In this embodiment, one set of the secondary sliding plate assemblies 360 is provided on the left cross beam 312 and the right cross beam 316, and the two sets of the secondary sliding plate assemblies 360 cooperate to mount the calibration elements.

Specifically, the secondary sliding plate assembly 360 includes a secondary sliding plate 361 and at least two pulley rods 362 each having one end detachably mounted to the secondary sliding plate 361 and the other end mounted in the second sliding groove 3124. Thus, the secondary sliding plate 361 can slide in the second sliding groove 3124 by means of the pulley rod 362 to provide different hanging positions for the calibration element.

An end of the secondary sliding plate 361 away from the second sliding groove 3124 is provided with two embedding openings 3611, wherein magnetic members are embedded in the embedding openings 3611 and can be used for attracting the calibration element; in this case, the calibration element needs to be made of a magnetic material or have a region where part of the calibration element can be magnetically attracted; and the magnetic members on the two secondary sliding plates 361 jointly attract the calibration element to play the role of hanging the calibration element. The magnetic member may be a magnet or other objects having magnetic properties. Further, a slot opening 3612 is provided at a side end of the secondary sliding plate 361 and is used for holding the calibration element, in particular use, two ends of the calibration element are respectively received by the slot openings 3612 on the two sliding plates 361 to jointly hold the calibration element. The slot openings 3612 of the two sliding plates 361 need to face simultaneously to the position where the fixed column 210 is located in the middle.

The pulley rod 362 is similar in structure to the roller rod 352 in that it is rolled by means of a bearing, and a detailed description of the pulley rod 362 will not be given here.

It should be appreciated that in order to know the position of the primary sliding plate assembly 350 and the secondary sliding plate assembly 360 on the cross beam 310, the cross beam 310 is provided with a track bar 318 having a scale. In this embodiment, the track bar 318 is disposed in an axial direction of the cross beam 310.

As shown in FIG. 25, the secondary sliding plate assembly 360 further includes a stop structure mounted to the secondary sliding plate 361 for stopping the secondary sliding plate 361 from random movement, resulting in inaccurate ADAS calibration. In this embodiment, the stop structure includes a mounting seat 363, a support shaft 364, a torsion spring 365, a wrench 366 and a brake 367, wherein the mounting seat 363 is mounted to the secondary sliding plate 361, the support shaft 364 is mounted to the mounting seat 363, the torsion spring 365 and the wrench 366 are sleeved on the support shaft 364, one end of the torsion spring 365 abuts against the secondary sliding plate 361, the other end of the torsion spring 365 abuts against the wrench 366, one end of the brake 367 is connected to the wrench 366, and the other end of the brake 367 abuts against the cross beam 310. As such, under the action of the brake 367, the secondary sliding plate 361 is blocked from being freely moved, and the secondary sliding plate 361 is in a locked state; when the wrench 366 is unplugged, the wrench 366 drives the brake 367 to move in a direction away from the cross beam 310, so that the secondary sliding plate 361 can slide in the second sliding groove 3124 via the pulley rod 362, the wrench 366 is released, and under the action of the torsion spring 365, the wrench 366 will push the brake 367 to move in a direction close to the cross beam 310 and abut, so that the secondary sliding plate 361 returns to a locked state.

In some embodiments, the secondary sliding plate assembly 360 further includes a pointer member 368 removably mounted to the secondary sliding plate 361 for indicating the scale position of the secondary sliding plate 361 on the cross beam 310. That is, the distance moved by the secondary sliding plate 361 or the distance from the center of the cross beam 310 can be known according to the scale of the track bar 318 indicated by the pointer 368.

With the above structure, when the user needs to adjust the position of the secondary sliding plate 361, the locked state of the secondary sliding plate 361 is released by the wrench 366 before the secondary sliding plate 361 can be moved. In this way, the position of the secondary sliding plate 361 can be effectively locked, and the stability during ADAS calibration can be improved.

Figure 26:
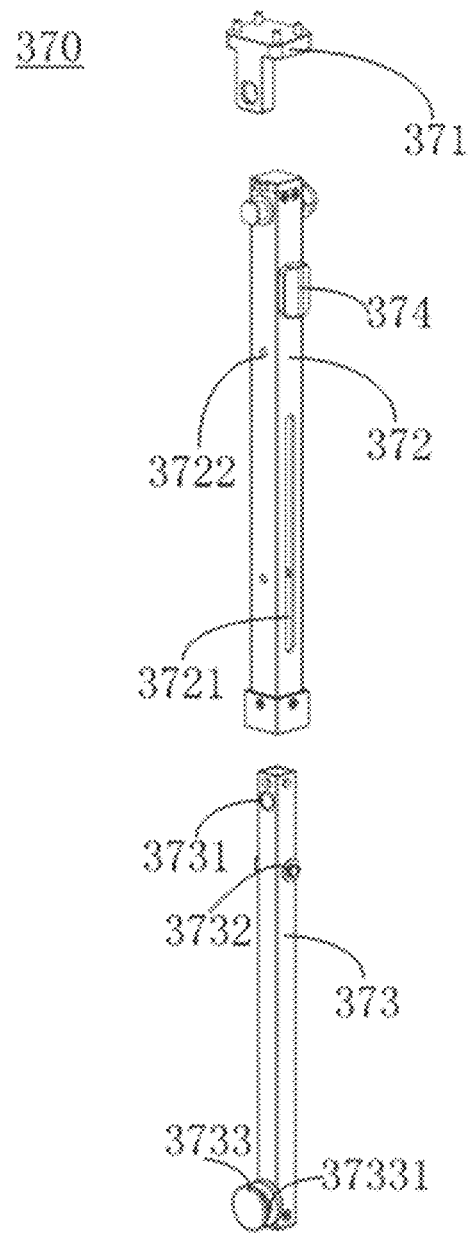
FIG. 26 is a structural schematic diagram of the suspension rod assembly of FIG. 13.

As shown in FIG. 26, in some embodiments, the hanging mechanism further includes a suspension rod assembly 370 mounted to the cross beam 310, and the suspension rod assembly 370 is used for supporting the calibration element. Specifically, the suspension rod assembly 370 includes a connecting block 371 mounted to the cross beam 310, a receiving rod 372 connected to the connecting block 371 and provided with a receiving space, and a support rod 373 received in the receiving space and can be extended or retracted relative to the receiving rod 372 and used for supporting the calibration element.

The receiving rod 372 has a sliding hole 3721 and a positioning hole 3722, wherein the sliding hole 3721 is in the shape of an elongated hole and 1 is arranged in an axial direction of the receiving rod 372, the sliding hole 3721 is arranged at two opposite side ends of the receiving rod 372, the number of the positioning holes 3722 is two, and the two positioning holes 3722 are arranged along the axial distance of the receiving rod 372.

The support rod 373 is provided with a spring bead 3731, a guide shaft 3732 and a suspension block 3733, wherein the spring bead 3731 is located at one end of the support rod 373, the suspension block 3733 is located at the other end of the support rod 373, the guide shaft 3732 is located between the spring bead 3731 and the suspension block 3733, the guide shaft 3732 passes through the two opposite ends of the support rod 373, and the ends of the guide shaft 3732 extend out of the sliding hole 3721. The spring bead 3731 may protrude out of the receiving space and be inserted into a positioning hole 3722 to adjust the length of the support rod 373 extending out of the receiving rod 372. The suspension block 3733 is provided with a clamping groove 37331 used for clamping the calibration element.

When the user pulls the support rod 373, the spring bead 3731 is retracted into the receiving space, and under the action of the guide shaft 3732, the support rod 373 is directionally drawn out of the receiving rod 372 along the slide hole 3722 until the spring bead 3731 is inserted into the other hole 3722 again. The length of the support rod 373 is adjusted to better hang the calibration elements as required.

It should be appreciated that the number of the positioning holes 3722 is not limited to the two mentioned in the above embodiment, and may be increased as needed. The adjustment structure of the support rod 373 with respect to the receiving rod 372 is not limited to the form of a spring bead and a positioning hole, as long as the structure for adjusting the length of the support rod 373 with respect to the receiving rod 372 can be applicable, for example, a pin shaft and a pin hole can be inserted into each other, in this case, the receiving rod 372 is provided with a plurality of pin holes in an axial direction thereof, and the support rod 373 is also provided with a plurality of pin holes, and the relative lengths of the two can be fixed by inserting the pin shaft through the pin holes at different positions of the receiving rod 372 and the support rod 373.

In some embodiments, the connecting block 371 is hinged to the receiving rod 372, the suspension assembly 370 further includes a magnetic member 374, a magnetic block (not shown) is mounted to the cross beam 310, the magnetic member 374 and the magnetic block are both magnetic, and the magnetic member 374 and the magnetic block are magnetically attracted. As such, when the receiving rod 372 is rotated toward the direction close to the cross beam 310, the magnetic member 374 is magnetically attracted to the magnetic block so that the receiving rod 372 can be foldably received with respect to the cross beam 310. In this embodiment, the connecting block 371 and the magnetic block are both mounted to the connecting portion 314, such that when the cross beam 310 is in the folded state, the receiving rod 372 may also magnetically engage with the magnetic block via the magnetic member 374 such that the receiving rod 372 and the connecting portion 314 are approximately in the same horizontal line, thereby minimizing the volume of the vehicle measurement device 900 and stabilizing the receiving rod.

It can be appreciated that the calibration element may be supported in a variety of ways, for example: (1) hanging is achieved through two of the mounting holes 3511 or the two arc holes 3512 on the main sliding plate 351; (2) the calibration element is attracted via magnetic members mounted to two of the secondary sliding plates 361; (3) the calibration element is held by the slot openings 3612 on the sides of the two secondary sliding blocks 361; (4) support is achieved jointly by the slot openings 3612 on the sides of the two secondary sliding plates 361 and the two suspension assemblies 370.

Figure 27:
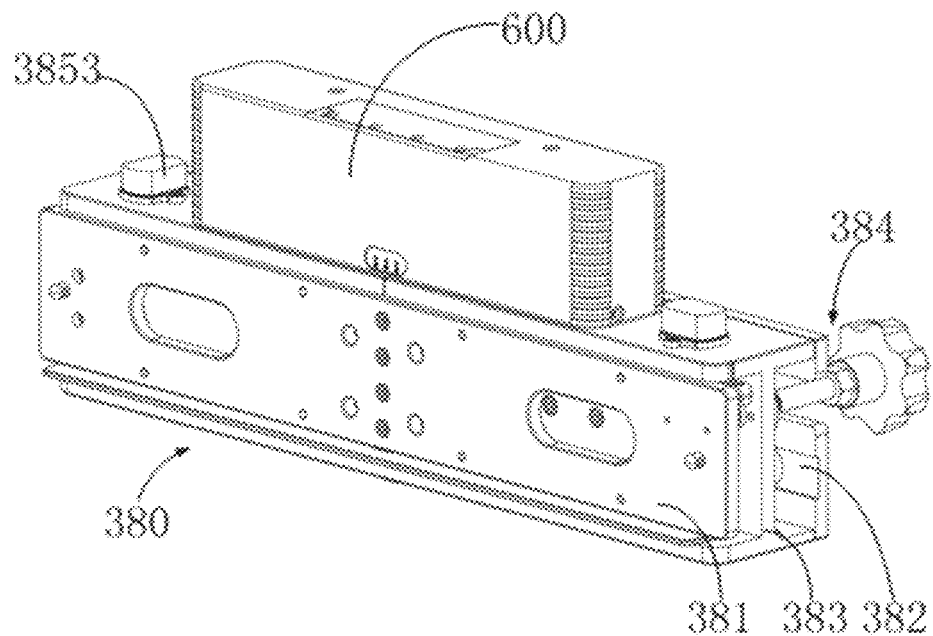
FIG. 27 is a structural schematic diagram of the configuration of the main controller and adjustment mechanism of FIG. 1.
Figure 28:
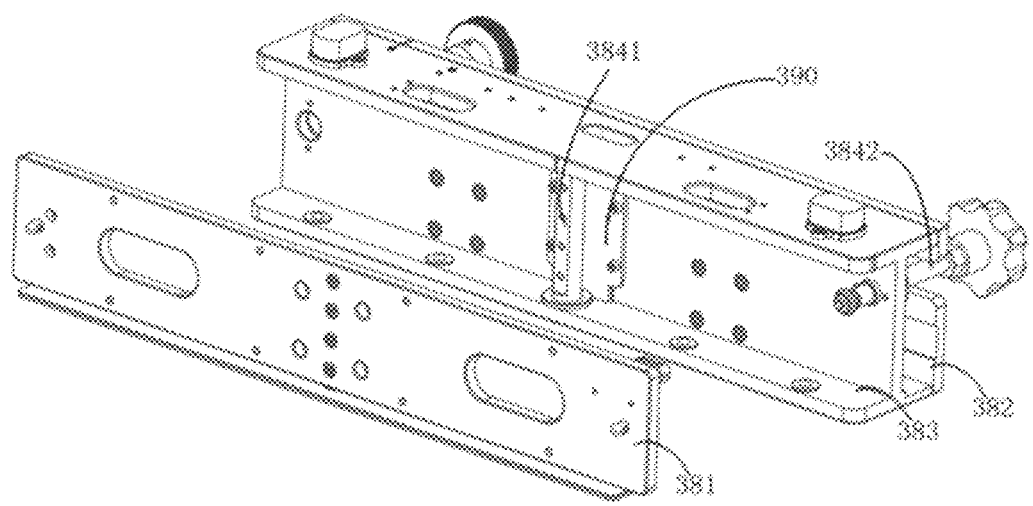
FIG. 28 is an exploded view of a portion of the structure of FIG. 27.
Figure 29:
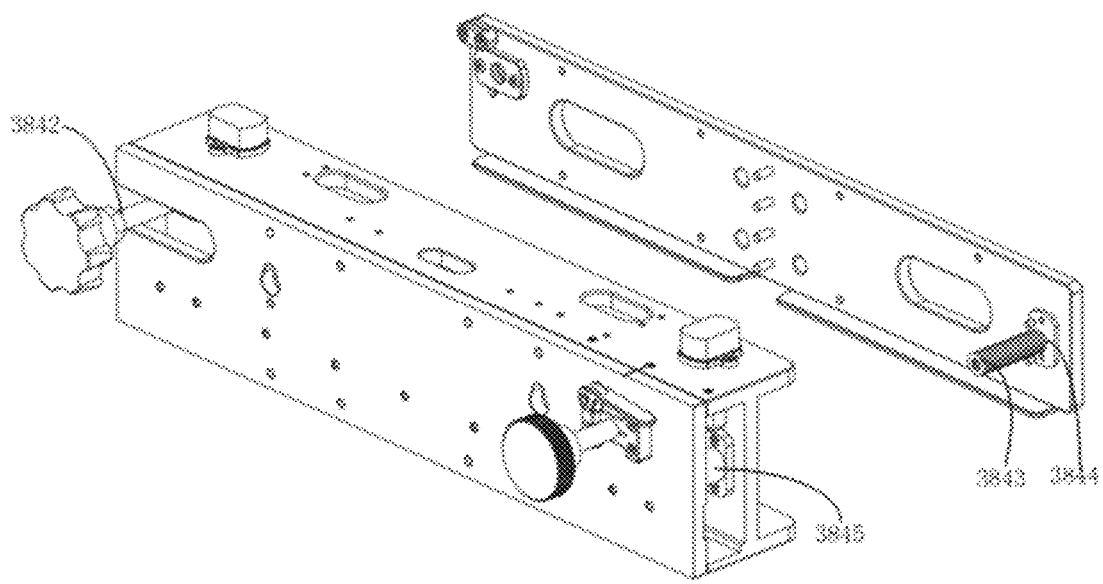
FIG. 29 is an exploded view of the adjustment mechanism of FIG. 27.
Figure 30:
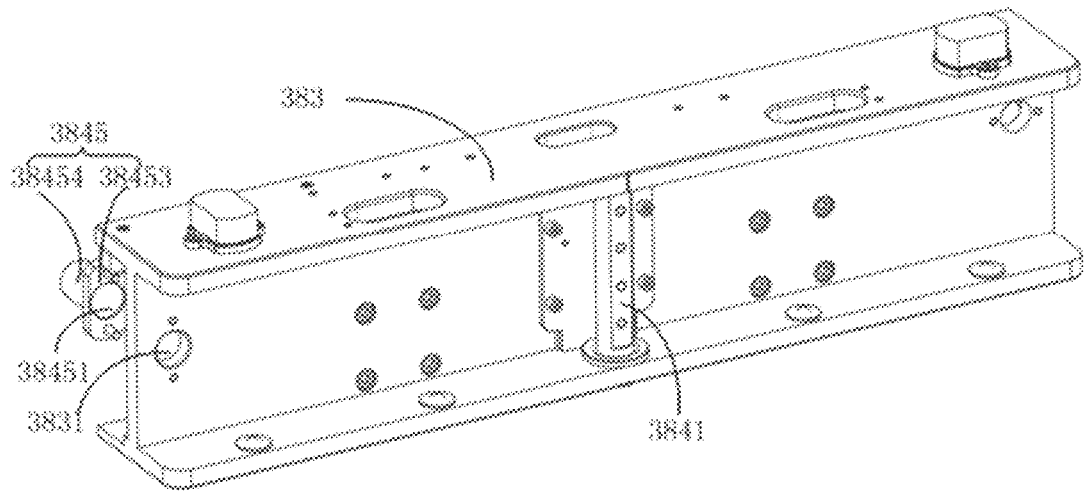
FIG. 30 is a schematic diagram of a portion of the structure of FIG. 27.

Referring to FIGS. 27-29, in some embodiments, the cross-beam module 300 further includes an adjustment mechanism 380 connected to the movable column assembly 220, the cross beam 310 is mounted to the adjustment mechanism 380 for adjusting position of the cross beam relative to the fixed column.

The adjustment mechanism 380 includes a first connecting plate 381 connected to the cross beam 310, a second connecting plate 382 connected to the lifting plate 223, a support plate 383 located between the first connecting plate 381 and the second connecting plate 382, and an adjustment assembly 384 mounted to the first connecting plate 381, the second connecting plate 382, and the support plate 383, the adjustment assembly 384 is used for adjusting the relative position between the cross beam 310 and the fixed column 210. In this embodiment, the support plate 383 is "I" shaped. Of course, the shape of the support plate 383 may be other types, and is not limited to the I-shape in this embodiment.

In some embodiments, in order to enable the cross beam 310 to better fit closely with the first connecting plate 381 and facilitate mounting, a bracket (not shown) is mounted at the bottom of the first connecting plate 381, either end of the bracket protruding from the edge of the first connecting plate 381, so that the bracket can support the bottom of the cross beam 310 when the first connecting plate 381 fits closely with the cross beam 310, thereby achieving quick positioning mounting.

The adjustment assembly 384 includes a pivot shaft 3841, a first driving rod 3842, a resilient member 3843 and a mounting rod 3844, wherein the pivot shaft 3841 is rotatably mounted at a middle portion of the support plate 383, the first connecting plate 381 is connected to the pivot shaft 3841, the first driving rod 3842 is screwed to the support plate 383, and one end of the first driving rod 3842 is connected to one end of the first connecting plate 3841, the mounting rod 3844 is mounted to the other end of the first connecting plate 381, and the mounting rod 3844 faces the support plate 383, and the resilient member 3843 is sleeved on the mounting rod 3844.

When a user twists the first driving rod 3842, and moves one end of the first connecting plate 381 away from the support plate 383, under the action of the pivot shaft 3841, the other end of the first connecting plate 381 moves closer to the support plate 383 and presses the resilient member 3843, so that the first connecting plate 381 drives the cross beam 310 to rotate around the fixed column 210. On the contrary, when the first driving rod 3842 is screwed in the opposite direction, one end of the first connecting plate 381 is moved closer to the fixed column 210, and the other end of the first connecting plate 381 is moved away from the support plate 383 by the resilient member 3843, so that the vertical distance between the left cross beam 312 and the fixed column 210 can be adjusted as needed. In this embodiment, the resilient member 3843 is a spring. Of course, the resilient member 3843 is not limited to the spring in this embodiment, and for example, the resilient member 3843 may be silica gel or the like.

As shown in FIG. 29, the adjustment assembly 384 further includes a receiving member 3845 having an opening 38451 at one end thereof, the support plate 383 is provided with a communication hole 3831, the receiving member 3845 is mounted to the support plate 383, the opening 38451 communicates with the communication hole 3831, the resilient member 3843 is partially received in the receiving member 3845, and one end of the resilient member 3843 abuts against the bottom of the receiving member 3845 and the other end of the resilient member 3843 abuts against the first connecting plate 381. The aperture of the communication hole 3831 should be greater than an axial diameter of the mounting rod 3844, so that the first connecting plate 381 has a movable space when driving the mounting rod 3844 to rotate. In this embodiment, the receiving member 3845 includes a boss 38453 and a column 38454, wherein the column 38454 is connected to the boss 38453, one end portion of the column 38454 is provided with the opening 38451, the opening 38451 extends through the boss 38453, the resilient member 3843 is received in the column 38454, and one end of the resilient member 3843 abuts against the bottom of the column 38454 and the other end abuts against the first connecting plate 381. As such, when the other end of the first connecting plate 381 presses the resilient member 3843, the resilient member 3843 will be compressed toward the inside of the column 38454, so that the first connecting plate 381 has more movable stroke.

Figure 31:
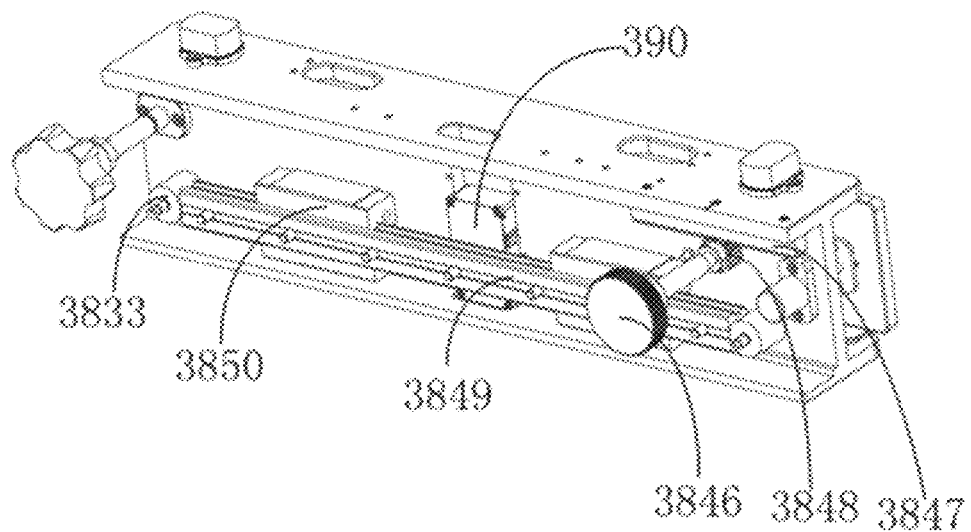
FIG. 31 is a partial structural schematic diagram of FIG. 27.

As shown in FIG. 31, in some embodiments, the adjustment assembly 384 further includes a second screw 3846, a rack 3847, a gear 3848, and a sliding bar 3849 mounted to the support plate 383 and slidable in a predetermined direction relative to the support plate 383. The second connecting plate 382 is connected to the sliding bar 3849, the rack 3848 is mounted to the support plate 383, the second connecting plate 382 is provided with a relief hole 3822, one end of the second screw 3846 is mounted with the gear 3848, the other end of the second screw 3846 passes through the relief hole 3822, and the gear 3848 meshes with the rack 3847. As such, when the second screw 3846 is screwed, the gear 3848 drives the rack 3847 to move the support plate 383 in the predetermined direction. In this embodiment, the predetermined direction is a direction in which the I-shaped support plate 383 is stretched. The sliding bar 3849 is slidably mounted to the support plate 383 by providing a guide block 3850 with a convex surface on the support plate 383 and providing a groove on the guide block 3850, and the sliding bar 3849 is cooperatively mounted with the guide block 3850, and the sliding bar 3849 can slide through the groove.

If the predetermined direction and the direction of the cross beam 310 are on the same horizontal line, the second screw 3846 is screwed, that is, the cross beam 310 can be moved leftward or rightward with respect to the fixed column 210, thereby adjusting the distance from the center of the left cross beam portion 312 and the center of the right cross beam portion 316 to the central axis of the fixed column 210.

Further, in order to prevent the support plate 383 from separating from the second connecting plate 382 under the drive of the second screw 3846, the support plate 383 is provided with a limiting block 3833, the number of the limiting blocks 3833 is two, and two of the limiting blocks 3833 are respectively located at two ends of the sliding bar 3849; in this way, limited by the limiting block 3833, the guide sliding block 3850 can only move a certain stroke, relief the guide sliding block 3850 from separating from the guide sliding bar 3849, and at the same time, the stroke of the rack 3848 moving left and right is the same as the stroke that the guide sliding block 3850 can move.

Figure 32:
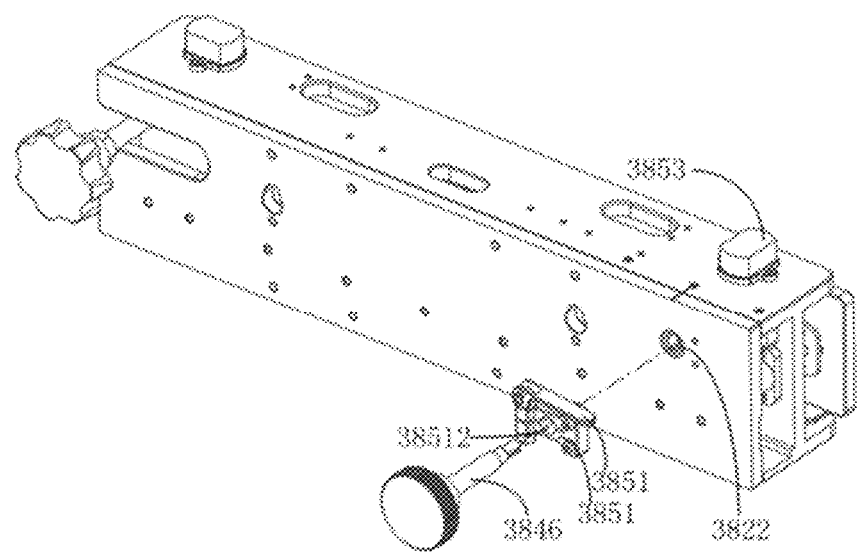
FIG. 32 is an exploded view of a portion of the structure of FIG. 27.

As shown in FIG. 32, in some embodiments, the adjustment assembly 384 further includes a locking structure mounted to the second connecting plate 382 for locking the second screw 3846 to prevent rotation of the second screw 3846 due to a human error. In this embodiment, the locking structure includes a clip member 3851 having an annular hole 38512 through which the clip member 38512 is fitted around the second screw 3846, and a locking member 3852 fixedly mounted at the second connecting plate 382, wherein the locking member 3852 is hinged with the clip member 3851. The diameter of the annular hole 38512 is greater than the shaft diameter of the second screw 3846. The locking member 3852 has a cam shape at one end for coupling with the clip member 3851.

When the locking member 3852 is in the first position, at this time, the locking member 3852 does not compress the clip member 3851 to thread the second screw 3846, and the support plate 383 is movable relative to the second connecting plate 382. The locking member 3852 is rotated to the second position, the locking member 3852 will compress the clip member 3851 and cause a hole wall of the annular hole 38512 to closely engage the second screw 3846 which will now be in the locked state.

In some embodiments, the adjustment mechanism further includes a horizontal bead 3853 mounted to the support plate 383 for detecting whether the cross beam 310 is horizontal. If the horizontal bead 3853 indicates that the cross beam 310 is not horizontal, adjustment may be made by adjusting the foot cup 113 of the base module 100 until the horizontal bead 3853 indicates that the cross beam 310 is horizontal. As such, the error generated when the vehicle measurement device 900 is calibrated can be effectively reduced.

As shown in FIGS. 28 or 31, in some embodiments, the support plate 383 is provided with a receiving cavity (not shown), the cross-beam module 300 further includes a laser 390 received in the receiving cavity and fixedly connected to the support plate 383, and the laser 390 is used for measuring the height of the cross beam 310 from the ground.

Referring again to FIG. 13, in some embodiments, the camera assembly 400 includes a first camera 410 mounted to the left cross beam portion 312, e.g. at an end of the left cross beam portion 312, and a second camera 420 mounted to the right cross beam portion 316, e.g. at an end of the right cross beam portion 316, for acquiring an image of wheels on two sides of the vehicle, or an image of a target near or attached to the wheel on two sides of the vehicle, respectively. Further, the camera assembly 400 also includes a third camera 430 mounted to the connecting portion 314 for acquiring an image of a head region of the vehicle. The first, second and third cameras may be detachably mounted to the cross beam, or the first, second and third cameras may be fixedly mounted to the cross beam.

Figure 33:
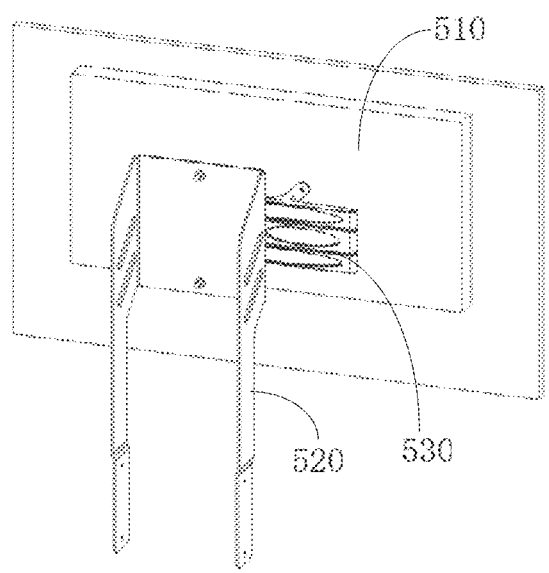
FIG. 33 is a schematic diagram of the display assembly of FIG. 1.

As shown in conjunction with FIG. 33, in some embodiments, the vehicle measurement device 900 further includes a display assembly 500 connected to the fixed column 210 for displaying images acquired by the camera assembly. Specifically, the display assembly 500 includes a display screen 510 and a fixed bracket 520 mounted to the fixed column 210, and the display screen 520 is mounted to the fixed bracket 520.

Figure 34:
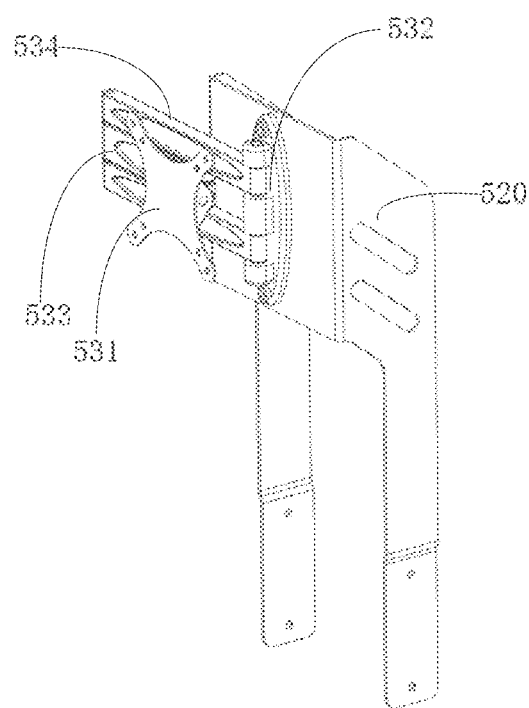
FIG. 34 is a schematic diagram of a portion of the structure of FIG. 32.

Further, the display assembly 500 further includes a folding bracket 530, and as shown in FIG. 34, the folding bracket 530 includes a first fixing piece 531, a second fixing piece 532, a first support arm 533 and a second support arm 534, wherein the first fixing piece 531 is fixedly connected to the display screen 510, one end of the first support arm 533 is hinged to the first fixing piece 531, the other end of the first support arm 533 is hinged to one end of the second support arm 534, the other end of the second support arm 534 is connected to the second fixing piece 532, and the second fixing piece 532 is connected to the fixed bracket 520. The second support arm 534 is rotatable with respect to the first fixing piece 531, and the first support arm 533 is rotatable with respect to the second support arm 534. Since the first support arm 533 and the second support arm 534 are both rotatable, the display screen 510 will have different distances from the fixed column 210 according to the user's needs. When the folding bracket 530 is not used, the display assembly 500 is located at a side facing away from the cross-beam module, and when the folding bracket 530 is used, the display assembly 500 can be rotated to the same side as the cross-beam module, i.e., a side facing the vehicle, so that a user can observe a measurement result or a maintenance result in real time while measuring or maintaining the vehicle.

In some embodiments, the vehicle measurement device 900 further includes a main controller 600, wherein the main controller 600 is mounted to the support plate 383, and the main controller 600 is connected to the display screen 510 and the first camera 410, the second camera 420 and the third camera 430, respectively, wherein the first camera 410, the second camera 420 and the third camera 430 can be wired or wirelessly connected to the main controller 600, and when wired, the electrical connection line between the above-mentioned cameras and the main controller 600 is received inside the cross beam 310. The main controller 600 may be wirelessly connected to the display screen 510. The main controller 600 is used for processing an image acquired by a camera to obtain processed data such as a measurement result, a calibration result, and a guiding step, and transmitting the processed data to the display screen 510 for display. A user may adjust the vehicle or vehicle measurement device based on the data displayed on the display screen.

In some embodiments, the vehicle measurement device 900 further includes a support 700 mounted to the fixed column 210 for supporting a portable diagnostic device. The display interface of the portable diagnostic device may be synchronized with the display interface of the display screen 510. The main controller 600 can be wirelessly connected to the portable diagnostic device, and the main controller 600 can be used for sending image data acquired by the camera to the portable diagnostic device for further processing by the portable diagnostic device, such as measuring wheel parameters, determining a calibration result, obtaining position information about the vehicle measurement device relative to the vehicle, determining a user guidance operation step, etc.

The main control unit 600 of the present application can be electrically connected to all the electronic components involved in the present application, such as the above-mentioned control system, detection sensor, emergency control button, lifting button, etc. and the main control unit can be used for receiving signals of the electronic components and can issue instructions to the connected electronic components.

For example, upon receiving a signal transmitted by an emergency control button, a lifting button or the like, the main controller may control the control system according to the specific signal, so that the control system controls the drive assembly to drive the emergency stop, lifting or lowering of the cross-beam module.

As another example, the main controller may receive a signal from a detection sensor and determine that the cross-beam module is currently in an extended state or in an unfolded state. If the main controller detects that the cross-beam module is in an unfolded state, the control system can be allowed to open the drive assembly, and if the main controller detects that the cross-beam module is in a folded state, a command is not issued to the control system to enable the control system to open the drive assembly, further, the main controller can also prompt a user to put the cross-beam module in the unfolded state via a display screen.

For another example, the main controller may determine that the cross-beam module is currently in an unfolded state or a folded state according to the images acquired by the first camera and the second camera. For example, the first camera is provided with a self-calibrated target, the second camera is provided with a self-calibrated camera capturing the self-calibrated target, and if the acquired image captured by the self-calibrated camera contains the self-calibrated target, it is indicated that the cross-beam module is in an unfolded state, and if the acquired image captured by the self-calibrated camera does not contain the self-calibrated target, it is indicated that the cross-beam module is in a folded state.

Of course, other ways of data processing and transmission may be implemented by the main controller, which is not limited herein.

In some embodiments, the vehicle measurement device 900 further includes a handle 800 mounted to a side end of the fixed column 210.

The vehicle measurement device 900 provided by an embodiment of the present invention includes a base module 100, a column module 200, a cross-beam module 300, and a camera assembly 400; wherein the column module 200 includes a fixed column 210, a movable column assembly 220 and a drive assembly 230, the fixed column 210 is connected to the base module 100, the movable column assembly 220 is mounted to the fixed column 210 and is connected to the drive assembly 230 used for driving the movable column assembly 220 to lift or lower relative to the fixed column 210; the cross-beam module 300 is supported by the movable column assembly 220, and the cross-beam module 300 is used for supporting a calibration element; A camera assembly 400 cross-beam module 300 is a camera assembly 400 for capturing the wheel information of a vehicle. By means of the structure, the vehicle measurement device 900 can not only calibrate an ADAS, but also perform four-wheel positioning, so that it is unnecessary to purchase two devices, and the cost is reduced. At the same time, the vehicle does not need to be moved to two stations for maintenance, so that the maintenance efficiency is improved, and the device is more convenient to use.

The present invention also discloses a calibration method applied to the vehicle measurement device 900 in the above-described embodiment, wherein the vehicle measurement device further includes a processor, the cross-beam module includes a cross beam to which the camera assembly is mounted, a calibration device is mounted to the wheels of the vehicle, the calibration device employs a combination of an existing hub holding device and a target plate, and the calibration method includes:

acquiring a first calibration image of the calibration device on one side of the vehicle acquired by the camera assembly;

determining, according to the first calibration image, a first position of the wheels on one side of the vehicle relative to the camera assembly;

acquiring a second calibration image of a calibration device on the other side of the vehicle acquired by the camera assembly;

determining, according to the second calibration image, a second position of the wheels on the other side of the vehicle relative to the camera assembly; and determining a status of the wheels of the vehicle according to the first position and the second position.

While the foregoing is directed to embodiments of the present invention, other and further embodiments of the present invention may be devised without departing from the basic scope thereof, and the scope thereof is determined by the claims that follow.

The invention claimed is:

1. A vehicle measurement device, comprising:
a base module;
a column module comprising a fixed column, a movable column assembly, and a drive assembly, wherein the fixed column is fixedly connected to the base module, the movable column assembly is movably mounted to the fixed column, the movable column assembly is connected to the drive assembly, and the drive assembly is configured for driving the movable column assembly to lift or lower relative to the fixed column; and
a cross-beam module supported by the movable column assembly and configured for supporting a calibration element for calibrating an auxiliary driving system of a vehicle;
wherein the drive assembly is further configured for driving the cross-beam module to lift or lower relative to the movable column while driving the movable column assembly to lift or lower relative to the fixed column;
a camera assembly mounted to the cross-beam module for acquiring an image associated with the vehicle; and
wherein the drive assembly is configured to drive the movable column assembly in both a same direction and an opposite direction of the cross beam module.

2. The vehicle measurement device according to claim 1, wherein a moving speed of the cross-beam module is a multiple of a moving speed of the movable column assembly, and the multiple is greater than or equal to 1.

3. The vehicle measurement device according to claim 1, wherein the drive assembly comprises a pusher comprising a push rod and a body, the push rod is mounted to the body, and an end of the push rod away from the body is connected to the movable column assembly;
when the push rod gradually extends out of the body, the push rod will gradually push the movable column assembly to extend out of the fixed column, and when the push rod is retracted back into the body, the push rod will bring the movable column assembly to retract into the fixed column.

4. The vehicle measurement device according to claim 3, wherein the drive assembly further comprises a drive motor and a conversion box, an output shaft of the drive motor is connected to the conversion box, the body is connected to the conversion box, and the conversion box is connected to the fixed column;

when the output shaft of the drive motor is rotated, the conversion box will drive the push rod to push the movable column assembly to extend out of or retract into the fixed column.

5. The vehicle measurement device according to claim 4, wherein the bottom of the fixed column is provided with a fixed support, and the drive assembly further comprises a hinged plate mounted to an end of the conversion box facing the fixed support, and the fixed support is hinged with the hinged plate.

6. The vehicle measurement device according to claim 3, wherein the top of the fixed column is provided with a limit seat provided with a through opening, and an end of the push rod away from the body passes through the through opening and is connected to the movable column assembly.

7. The vehicle measurement device according to claim 6, wherein a side end of the limit seat is movably mounted with a roller that extends partially beyond an edge of the limit seat and abuts against the movable column assembly.

8. The vehicle measurement device according to claim 1, wherein the fixed column is provided with a receiving cavity, the movable column assembly is received in the receiving cavity, and the movable column assembly is movable to extend out of or retract into the receiving cavity.

9. The vehicle measurement device according to claim 8, wherein the fixed column is provided with a sliding assembly, the movable column assembly is connected to the sliding assembly configured for directionally lifting and lowering the movable column assembly under the action of the drive assembly.

10. The vehicle measurement device according to claim 8, wherein the sliding assembly comprises a guide rail mounted to an inner wall of the fixed column and arranged in an axial direction of the fixed column, and a sliding block fitted with the guide rail, and the sliding block is connected to the movable column assembly.

11. The vehicle measurement device according to claim 1, wherein the movable column assembly comprises a column, a traction member, a lifting plate, and a rotating member, the traction member is mounted to the column, one end of the traction member is connected to the fixed column, the other end of the traction member is connected to the lifting plate, and the lifting plate is connected to the cross-beam module, the rotating member is mounted to the column, and the other end of the traction member is around the rotating member and connected to the lifting plate;

when the drive assembly drives the movable column assembly to lift or lower relative to the fixed column, the traction member drives the cross-beam module to move relative to the column via the lifting plate.

12. The vehicle measurement device according to claim 11, wherein the traction member comprises a chain, the rotating element comprises a sprocket, and the chain and the sprocket are intermeshed.

13. The vehicle measurement device according to claim 11, wherein the column comprises a top plate at an end of the column away from the fixed column, and the rotating member is rotatably mounted to the support base.

14. The vehicle measurement device according to claim 11, wherein the column is provided with a guide structure by means of which the lifting plate is directionally moved in the axial direction of the column.

15. The vehicle measurement device according to claim 11, wherein the movable column assembly further comprises a connecting support mounted to the column and distributed in an axial direction of the column and away from the fixed column, and the connecting support is configured for connecting with the drive assembly.

16. The vehicle measurement device according to claim 11, wherein the movable column assembly further comprises a resistance reducing member mounted to the column and abuts against an inner wall of the fixed column.

17. The vehicle measurement device according to claim 11, wherein the movable column further comprises a guide link mounted to the column and connected to the fixed column, and the guide link is configured for moving the column in the axial direction of the fixed column.

18. The vehicle measurement device according to claim 11, wherein a side end of the column is provided with a relief groove, the relief groove and the lifting plate are respectively located at two opposite side ends of the column, the column is movably received in the fixed column, and the relief groove is configured for relieving the drive assembly.

19. A vehicle calibration method applied to the vehicle measurement device according to claim 1, the vehicle measurement device further comprising a processor, the cross-beam module comprising a cross beam, the camera assembly being mounted to the cross beam, and a calibration device being mounted to wheels of the vehicle, wherein the method comprises:

acquiring a first calibration image of the calibration device on one side of the vehicle acquired by the camera assembly;

determining, according to the first calibration image, a first position of the wheels on one side of the vehicle relative to the camera assembly;

acquiring a second calibration image of a calibration device on the other side of the vehicle acquired by the camera assembly; determining, according to the second calibration image, a second position of the wheels on the other side of the vehicle relative to the camera assembly; and determining a status of the wheels of the vehicle according to the first position and the second position.

* * * * *